(12) United States Patent
Hofrichter et al.

(10) Patent No.: US 8,776,314 B2
(45) Date of Patent: Jul. 15, 2014

(54) ROLLER

(75) Inventors: Guenther Hofrichter, Velbert (DE); Karl-Heinz Plautz, Hagen (DE); Georg Hein, Luedenscheid (DE)

(73) Assignee: TENTE GmbH & Co. KG, Wermelskirchen (DE)

( * ) Notice: Subject to any disclaimer, the term of this patent is extended or adjusted under 35 U.S.C. 154(b) by 0 days.

(21) Appl. No.: 14/124,016

(22) PCT Filed: Jun. 1, 2012

(86) PCT No.: PCT/EP2012/060392
§ 371 (c)(1),
(2), (4) Date: Dec. 5, 2013

(87) PCT Pub. No.: WO2012/171816
PCT Pub. Date: Dec. 20, 2012

(65) Prior Publication Data
US 2014/0101891 A1    Apr. 17, 2014

(30) Foreign Application Priority Data

Jun. 15, 2011  (DE) .......................... 10 2011 051 068
Aug. 12, 2011  (DE) .......................... 10 2011 052 693
Nov. 16, 2011  (DE) .......................... 10 2011 055 417

(51) Int. Cl.
*B60B 33/00* (2006.01)
*B60B 33/02* (2006.01)

(52) U.S. Cl.
CPC ......... *B60B 33/0078* (2013.01); *B60B 33/0042* (2013.01); *B60B 2200/24* (2013.01); *B60B 2900/325* (2013.01); *B60B 2200/242* (2013.01); *B60B 33/0057* (2013.01); *B60B 33/0086* (2013.01); *B60B 33/021* (2013.01)
USPC ........................................ 16/35 R; 188/1.12

(58) Field of Classification Search
USPC ......... 16/35 R, 35 D, 18 R, 47; 188/1.12, 69; 301/6.1
See application file for complete search history.

(56) References Cited

U.S. PATENT DOCUMENTS

| 4,677,706 A | * | 7/1987 | Screen .......................... 16/35 R |
| 5,014,391 A | * | 5/1991 | Schulte ......................... 16/35 R |
| 5,083,341 A | * | 1/1992 | Milbredt et al. .............. 16/35 R |

(Continued)

FOREIGN PATENT DOCUMENTS

| DE | 43 21 739 A1 | 1/1995 |
| DE | 10 2004 035220 A1 | 2/2006 |

(Continued)

OTHER PUBLICATIONS

International Search Report of PCT/EP2012/060392, mailed Aug. 27, 2012.

*Primary Examiner* — William Miller
(74) *Attorney, Agent, or Firm* — Collard & Roe, P.C.

(57) ABSTRACT

The invention relates to a roller (1), preferably comprising two wheels (2) and a locking device, an activating part (10) being able to act on the locking device for releasing or locking in a position that corresponds to a directional lock and/or in a position that corresponds to a total lock, and the activating part (10) being movable by a drive, a linear movement of a transmission part (7) that is generated by the drive being transmitted via spring force to the activating part (10) in order to move the activating part, and the activating part (10), in any case in a position corresponding to the total lock or in any case in a position corresponding to the direction lock, being in addition movable relative to the stationary transmission part, against a spring supported on the transmission part, into a release position by means of an actuating handle (11) that is movable independently of the drive and preferably by hand so as to override the total lock or the directional lock. In order to provide a roller that is formed in an advantageous manner with regard to an emergency release, it is proposed that a geometric axis of rotation (d) of the actuating handle (11) is disposed on the same side as the activating part (10) with respect to the axis of rotation (D) of the wheel (2), the activating part being disposed offset, in a vertical section, with respect to an axis of rotation (D) of the wheel (2).

13 Claims, 33 Drawing Sheets

(56) References Cited

U.S. PATENT DOCUMENTS

| | | | |
|---|---|---|---|
| 5,139,116 A * | 8/1992 | Screen | 188/1.12 |
| 7,506,404 B2 | 3/2009 | Block et al. | |
| 7,861,370 B2 * | 1/2011 | Chu | 16/35 R |
| 7,866,453 B2 * | 1/2011 | Wu | 190/18 A |
| 7,937,805 B2 * | 5/2011 | Tsai | 16/47 |
| 7,950,108 B2 * | 5/2011 | Yang et al. | 16/47 |
| 8,051,533 B2 * | 11/2011 | Block et al. | 16/35 R |
| 8,117,715 B2 * | 2/2012 | Tsai et al. | 16/35 R |
| 8,302,257 B2 * | 11/2012 | Lin | 16/35 R |
| 8,365,353 B2 * | 2/2013 | Block et al. | 16/35 R |
| 8,499,413 B1 * | 8/2013 | Tsai | 16/35 R |
| 2010/0077562 A1 | 4/2010 | Block et al. | |

FOREIGN PATENT DOCUMENTS

| | | |
|---|---|---|
| DE | 10 2007 039 208 A1 | 5/2008 |
| DE | 20 2009 015 840 U1 | 4/2010 |
| EP | 1 555 446 B1 | 7/2005 |

\* cited by examiner

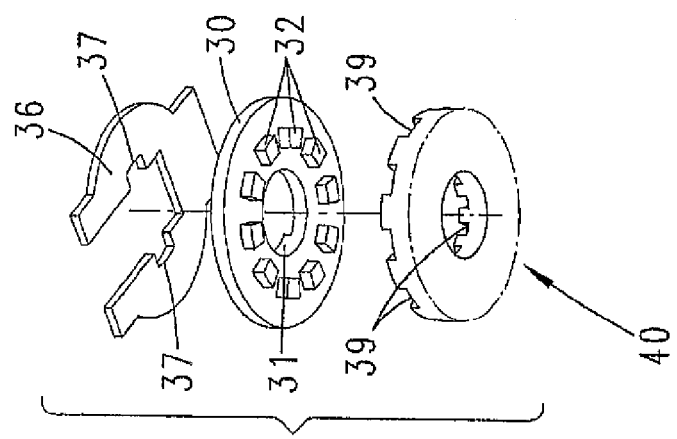
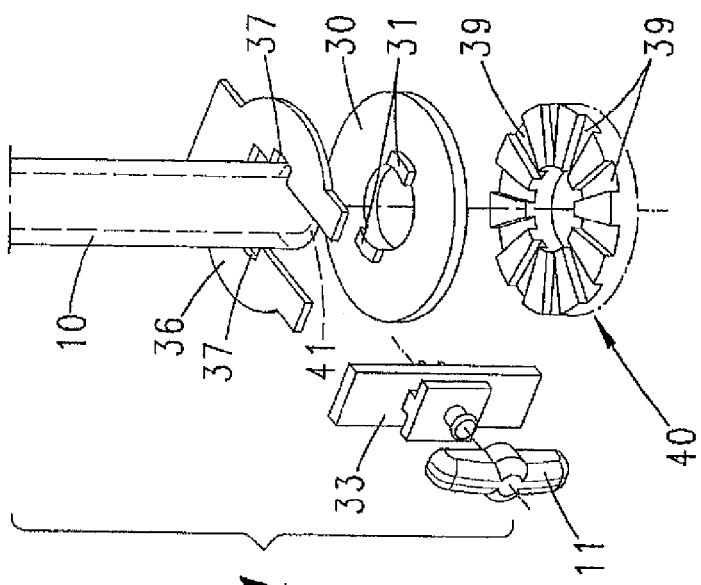

ROLLER

CROSS-REFERENCE TO RELATED APPLICATIONS

This application is the National Stage of PCT/EP2012/060392 filed on Jun. 1, 2012, which claims priority under 35 U.S.C. §119 of German Application Nos. 10 2011 051 068.0 filed on Jun. 15, 2011; 10 2011 052 693.5 filed on Aug. 12, 2011; and 10 2011 055 417.3 filed on Nov. 16, 2011, the disclosures of which are incorporated by reference. The international application under PCT article 21(2) was not published in English.

BACKGROUND OF THE INVENTION

1. Field of the Invention

The invention relates to a roller, preferably comprising two wheels and a locking device, an activating part being able to act on the locking device for releasing or locking in a position that corresponds to a directional lock and/or in a position that corresponds to a total lock, and the activating part being movable by a drive, a linear movement of a transmission part that is generated by the drive being transmitted via spring force to the activating part in order to move the activating part, and the activating part, in any case in a position corresponding to the total lock or in any case in a position corresponding to the directional lock, being in addition movable relative to the stationary transmission part into a release position, against a spring supported on the transmission part, by means of an actuating handle that is movable independently of the drive and preferably by hand so as to override the total lock or the directional lock.

2. The Prior Art

With regard to rollers of this type in general, reference is made in first instance to DE 10 2007 039 208 A1 (US 2010/0077562 A1), for example. In particular when such rollers are moved by an electric motor with regard to the directional and/or total lock, precautions have to be taken so that in the event of a motor failure, releasing is nevertheless still possible. For this purpose, an advantageous embodiment is sought for a release that is possible by manual intervention in the event of an emergency.

SUMMARY OF THE INVENTION

It is an object of the invention to provide a roller in particular of the aforementioned type, which roller is advantageously formed with regard to an emergency release.

According to a first teaching of the invention, it is provided for this purpose that a geometric axis of rotation of the actuating handle is disposed on the same side as the activating part with respect to the axis of rotation of the wheel, the activating part being disposed offset, in a vertical section, with respect to the axis of rotation of the wheel. The actuating handle and the activating part are configured to be structurally close to one another so that an advantageous application of force is possible. In particular, advantageous accommodation in the housing is also possible. When, as is preferred, the activating part is disposed in the region of a mounting journal, if necessary, in the vertical extension thereof, the actuating handle can also be accommodated in the associated region of the housing.

Further features of the invention are described and illustrated below, also in the description of the figures and in the drawings, often in their preferred association with the features already explained above; however, they may also be of importance in an association with only one or more individual features which are described herein or illustrated in the drawings, or independently or in some other overall concept.

Thus, it is preferred that the geometric axis of rotation of the actuating handle runs through the activating part and/or extends in a horizontal plane that passes through a wheel. The fact that the axis of rotation passes through the activating part means that the actuating handle and the activating part are to be arranged directly next to one another, the focus here preferably being on the entire range of movement of the actuating part, including both end positions in the case of a directional lock or total lock. In this manner, the shortest possible distance between the actuating handle, which is accessible from the outside, and the part to be acted on, the activating part, is achieved. Due to the fact that, alternatively or additionally, the axis of rotation also extends in the horizontal plane passing through a wheel, it is made clear at the same time that the arrangement is provided relatively far down with regard to the roller.

Furthermore, it is preferred that a horizontal plane which passes through the wheel axis also passes through the actuating handle. This describes the arrangement of the actuating handle at a vertical height that corresponds to the center region of a wheel of the roller.

A further preferred configuration provides that the actuating handle is vertically stationary during a movement of the actuating part. As described below in further detail, in principle it can in first instance be provided that together with a movement of the actuating part, the actuating handle moves vertically together with the actuating part, which is also possible independently of manual intervention via the actuating handle. However, it is preferred that the actuating handle is stationary so that during a (motor-driven) actuation of the roller, no movement of the actuating handle is visible from the outside at the same time. There is, so to speak, a decoupling between the activating part and the actuating handle via a decoupling mechanism which is described in further detail below. Thus, for example, unintentional blocking of the (motor-driven) movement of the activating part due to the actuating handle getting externally caught, for example, at a building step or an object standing in the region of the roller, is prevented.

It is in particular also preferred that a cantilever which interacts with the actuating part interacts with a sliding part guided in the housing in the direction of movement of the activating part. This configuration is at the same time also essential for the mentioned decoupling. Due to the fact that the cantilever moves the sliding part, the sliding part can be disposed inside the roller or inside the housing of the roller so as to be shielded from the outside. It is further preferred in this regard that the sliding part is guided in a stationary housing insert through which the actuating handle passes. Thus, the housing insert is part of the roller housing. The sliding part can also be guided directly in a housing shell part. However, with regard to the construction, it is more advantageous to provide such a housing insert as an additional feature in the housing.

The actuating handle may have a through pin that acts directly on the sliding part. Since the actuating handle is to be actuated by rotating, such a through pin, which preferably is arranged eccentrically or comprises an eccentric, can act on the sliding part during rotation of the actuating handle, preferably in particular without undergoing a vertical movement at the same time.

It is also preferred that the sliding part has a lower limit stop and an upper limit stop which can be acted on by the through pin for releasing in the total lock or the direction lock. If the activating part is in one of the mentioned positions, the actuating handle having the through pin is preferably arranged such that there is contact with the corresponding limit stop of the sliding part, or the limit stop can be reached after a short movement. Then, mechanical coupling between the actuating handle and the sliding part is established so that further movement then acts directly on the cantilever, and therefore on the activating part.

With regard to its rotary movement, the actuating handle can be spring-biased into a neutral position. This neutral position preferably corresponds to the aforementioned near-engagement position. When the activating part is in the position corresponding to the total lock or the directional lock, the through pin, due the neutral position, is in contact or nearly in contact with the corresponding limit stop of the sliding part.

The actuating handle can in first instance be formed such that it can be actuated directly by hand, for example by means of a rib or a projection formed on the outside thereof. However, it is preferred that it is formed so that it can preferably be actuated only with a simple tool such as a coin, a double claw, or the like. Thus, on the one hand, it can be achieved that handling is always possible in the case of an emergency, and, on the other hand, undesired actuations can also be prevented in the case of a non-emergency.

It is also preferred that an emergency release position, which is set by hand, is latched. The latching can be achieved, for example, in that in the course of the interaction of the through pin with one of the mentioned limit stops, the through pin moves into a detent recess in one of the limit stops. However, as can be seen, alternative configurations for latching are also possible. Thus, a rotary part of the actuating handle itself can interact with a detent cam which, for example, moves into a circumferential recess. The detent provides for unhindered movability of the roller when emergency-released in this manner. The release position does not have to be maintained by hand.

It is also preferred that after completion of the emergency release via the actuating handle, the neutral position of the actuating handle can be established again by a motor-driven movement of the activating part. This can be achieved in a preferred and particularly advantageous manner in conjunction with the already-described spring biasing of the actuating handle into a neutral position. Upon releasing the detent position, the actuating handle then moves back into the mentioned neutral position due to the spring bias. However, it is alternatively also possible that after the detent position is released, the actuating handle moves, for example due to gravity, into a position in which a detent is no longer provided.

It is also particularly preferred that for re-establishing the neutral position, the activating part is initially to be moved by motor further in the direction of the movement forced by the actuating handle. Once releasing the directional lock is achieved due to the actuation of the actuating handle, a further movement of the activating part in the corresponding direction, which then corresponds to the total lock, takes place, thereby disengaging the detent position, specifically, disengaging the through pin from a detent recess in one of the mentioned limit stops, as a result of which the actuating handle is released and can move into another position again, which no longer results in a detent, or simply into the neutral position. Conversely, in the case of an emergency release from the total lock, a further movement, which, however, can then only be induced by electric motor, of the activating part in the direction of the directional lock is needed to achieve the same effect. It is further preferred in this regard that in the case that the activating part is moved by a motor, in particular an electric motor, this motor always initially passes through a given cycle, so that in the event that an emergency release has previously taken place, the emergency release is reliably released and the motor is then in the customary operating cycle.

Furthermore, it is particularly preferred that in the case of such a roller, the transmission part can pass through a support region that is formed on the activating part and is provided for the spring. Thus, the transmission part can be moved—vertically—relative to the spring support part on the activating part. The possibility of nesting the activating part and the transmission part into one another is thus achieved. In particular, the activating part can comprise an opening that is open at least vertically at the top and that allows a corresponding engagement of the transmission part into the activating part, and a corresponding movement of the transmission part relative to the activating part. Due to the fact that the transmission part is provided on the activating part so that it vertically passes through a region for supporting a spring or, as further preferred, in the case of two springs, for supporting both springs, interaction between at least one of the springs and the transmission part is also enabled in a simple manner below the support region on the activating part for the spring or the springs. The transmission part preferably passes through the support region only with a linear movement, thus without rotation.

The drive can be an electric motor drive, and a component that is comparable to a rotor shaft of a standard electric motor can be provided as a part that is (only) linearly displaceable. This involves an electric motor, the rotor shaft of which is formed as a hollow part having an internal thread that interacts with a part that has a central external thread and accordingly is linearly movable when the rotor rotates. Such an electric motor is also designated as a linear actuator. With regard to linear actuators, reference is also made, for example, to EP 1 555 446 B1 and DE 20 2009 015 840 U1. In the present context, a linear actuator is preferred in which the linearly moved part (spindle) is centrally disposed, and a nut (threaded rotor) driving the linearly moved part is disposed surrounding the latter, within the drive.

In the position of the total lock and/or the directional lock, there is preferably also space for spring deflection, i.e., deflectability, so that with appropriate manipulation, the activating part can yield in a spring-loaded manner. This is advantageous in particular with regard to the already described emergency release. This configuration is also advantageous in the case of a positive-fit lock such as a toothed lock, for example. Latching that is not immediately possible at the time of the lock release can be compensated for in terms of height. A corresponding possibility to overrun the position to a certain extent, at least temporarily or initially, is also important however with regard to the drive. In one or both mentioned locking positions, the motor does not run "against a block," and thus, for example, there is no direct engagement of spring turns which in this position would have the effect of a solid part. Rather, due to the motor, overrunning this position to a certain extent is possible, which would merely result in a possible increase in spring force.

In the case of two springs acting between the transmission part and the activating part, it is preferred that the springs are arranged one above the other. More preferably, the springs abut one another in the vertical direction, i.e., without forming a vertical overlap region in which both springs possibly extend.

It is also preferred that the lower spring is supported by its upper end on the activating part, and the upper spring is supported by its lower end on the activating part. For this purpose, the activating part can have a radially inwardly projecting flange, for example, both sides of which serve for supporting one of these springs.

Furthermore, it is also preferred that independently of the operating state, which generally can be a full release or a total lock, and more preferably can also be only a directional lock, the spring, or in the case of two springs, one of the two springs, is disposed within the activating part. More preferably, both springs are disposed in each case within the activating part, independently of one of the mentioned positions.

Furthermore, it is also preferred that in the case of one spring, the one spring, otherwise in any case at least one, more preferably both springs, is/are disposed outside the transmission part.

It is particularly preferred that the transmission part and the activating part are formed as geometrically simple bodies, for example, as a rod or a tube. With regard to the formation of the support regions for the springs, this merely requires a deviation from the mentioned geometrically simple configuration.

It is particularly preferred that the transmission part is formed as a cylindrical part, with one or both springs being disposed on the outside with regard to the outer surface of the cylinder. Preferably, these are coil springs which are arranged coaxially with respect to the outer cylinder surface and surround the transmission part.

In further detail, the transmission part can be formed as a hollow part; on the other hand, however, it can also be substantially formed as a solid part. An internal thread can be provided in the region of its upper end. The transmission part can be coupled to the linear part of the linear actuator by means of the internal thread.

Accordingly, the linear part of the linear actuator can also be a solid part. At its end facing toward the transmission part, the linear part can have an external thread which is screwable into the internal thread of the transmission part so as to connect these parts.

The electric motor preferably is a stepper motor, more preferably a hybrid stepper motor or a permanent magnet stepper motor. Specifically, this is also a claw pole stepper motor.

The activating part may have a tubular design. In a deviation from the tubular shape, the mentioned inwardly protruding flange is provided here, on which flange a spring or the mentioned springs are supported, optionally by means of a washer.

A further deviation from the tubular shape with regard to the activating part can also be the connection, described below, of the activating part to a directional lock.

With regard to the emergency release by means of a handle, which can then be actuated independently of the rotary drive, it is furthermore preferably provided that the activating part is formed with a movement extension, which is furthermore preferably fitted on the outside with regard to the activating part and is movable directly, in particular by hand, so as to move the activating part. It is also possible that when the activating part is moved, for example by the mentioned rotary drive, the handle for the emergency release also undergoes a movement, optionally even in a visible manner, preferably in the vertical direction. However, if an emergency release is to be carried out, the required movement of the activating part can be carried out manually by means of the handle.

The handle can in particular also be formed as a rotary lever. By means of interaction with a support which is fixed to the housing, the rotary lever can transmit a displacement force vertically upwardly or vertically downwardly onto the activating part. For this, a cantilever fixedly connected to the activating part and serving as movement extension can be provided between the activating part and the rotary lever. The rotary lever is preferably fitted to the outside of the housing. Upon actuating the transmission part or the activating part, it can be seen that the rotary lever moves vertically upwardly or vertically downwardly, but by doing so does not undergo a rotational movement, but, rather, only the mentioned vertical movement.

It is further preferred that the spring can be lifted off the support region on the activating part by means of the transmission part. A corresponding carrier is preferably formed on the transmission part, and lifts the spring off the activating part during a corresponding movement of the transmission part relative to activating part.

Furthermore, the activating part preferably forms a lower central chamber which is open at the bottom and in which one of the springs or the spring is accommodated. In this respect, the activating part has a bell-like design. The central chamber, which is open at the bottom, is preferably also a cylindrical chamber.

With regard to the mentioned lifting of the spring off the support region, an upward lifting is preferably possible; it is further preferred, however, that locking via a corresponding limit stop, for example via an inwardly protruding step on the activating part, is possible at the bottom. When the spring is vertically moved further down relative to the activating part, it cannot be moved beyond a position defined in this respect.

Furthermore, an upper support region for the spring is preferably formed on the transmission part. With regard to this support region, it is preferably also provided that the spring can be lifted off in the downward direction. Accordingly, comparable to the mentioned support on the mentioned activating part, when the spring is moved upwardly relative to the transmission part, it cannot be moved beyond the support region.

With regard to the handle, which, if necessary, can be used for carrying out the emergency release, it is also preferred that the handle moves together with the activating part. When various customary operating states such as a directional lock and/or a neutral position and/or a total lock are assumed, a change between these operating positions is visible from the outside in the form of a corresponding displacement of the handle in the vertical direction.

In other respects, the handle is preferably fixedly connected to the activating part, with the exception that it is rotatable relative to the activating part. Furthermore, one or two abutments associated with the handle is or are formed on the housing, preferably on the outside thereof. The handle is movable relative to a stationary abutment. For example, by rotating the handle, supporting on an abutment can take place, and the supporting movement toward the activating part can therefore be used for moving the activating part from the total lock or the directional lock into the neutral position.

Furthermore, such a movement of the activating part by means of the handle is preferably carried out relative to the stationary transmission part while carrying along the supporting region or the support region of the spring. With regard to the support region, there can also be an upper support region on the activating part via which the spring is carried along during a corresponding movement of the activating part. This relates in particular to the movement of the activating part from the directional lock into the neutral position.

If two springs are provided, it is preferred that one spring is required for moving the activating part into a position corresponding to the total lock, and one spring is required for moving the activating part into a position corresponding to the directional lock. The functions of the springs can be separated in this manner.

In the case of two springs, which are preferably also arranged vertically one above the other, the lower spring can be supported with its [upper] end on the activating part, and the upper spring can be supported with its lower end on the activating part.

Also, it can be provided that a spring and/or the first spring and/or the second spring is/are disposed within the activating part. Preferably, a plurality of springs is in each case disposed completely within the activating part, in any case in a position that corresponds to the neutral position. However, a position that corresponds to the directional lock and/or a position that corresponds to the total lock is/are also preferred. This can be achieved by an overall tubular design of the activating part in which a spring or, if applicable, two springs are arranged in particular vertically one above the other. This can also be achieved only in the lower portion of the activating part, for example by means of the mentioned bell-shaped widening. Furthermore, it is also preferred that a spring or, if two springs are provided, at least one of the two springs or both springs is/are disposed outside the transmission part. The transmission part can thus be formed in a very simple manner even in this region, in any case as a solid part.

It is further preferred that the transmission part is disposed within the activating part. It can thus also be guided in an advantageous manner within the activating part. Guiding the transmission part within the activating part can also be achieved, for example, by means of a support part and/or supporting part.

With regard to the handle, it is preferred that the handle is rotatable relative to the carrier or the movement extension.

With regard to the respective end positions of the linear part and/or of the transmission part and/or of the activating part, it is preferred that they are monitored by sensors, more preferably by sensors arranged outside the electric motor. The respective end positions can be taken into account in a controller of the electric motor. However, if an end position is not reached, or is not reached after a given period of time, a warning message can also be output, for example.

BRIEF DESCRIPTION OF THE DRAWINGS

The invention is explained in greater detail below with reference to the accompanying drawings, which show exemplary embodiments of the invention. A part that is explained only with reference to one of the exemplary embodiments, and in a further exemplary embodiment is not (specifically) replaced by another part due to the special feature emphasized therein, is therefore also described for this further exemplary embodiment as a part which in any case is potentially present. In the figures:

FIG. 11 shows an exploded view of the activating part in the region of the emergency release;

FIG. 12 shows a perspective view diagonally from below of the parts interacting with regard to the directional lock and the total lock;

FIG. 23*a* shows a cross-section corresponding to FIG. 23, after completion of the emergency release from the position in FIG. 21;

DETAILED DESCRIPTION OF THE DRAWINGS

Figure 1:
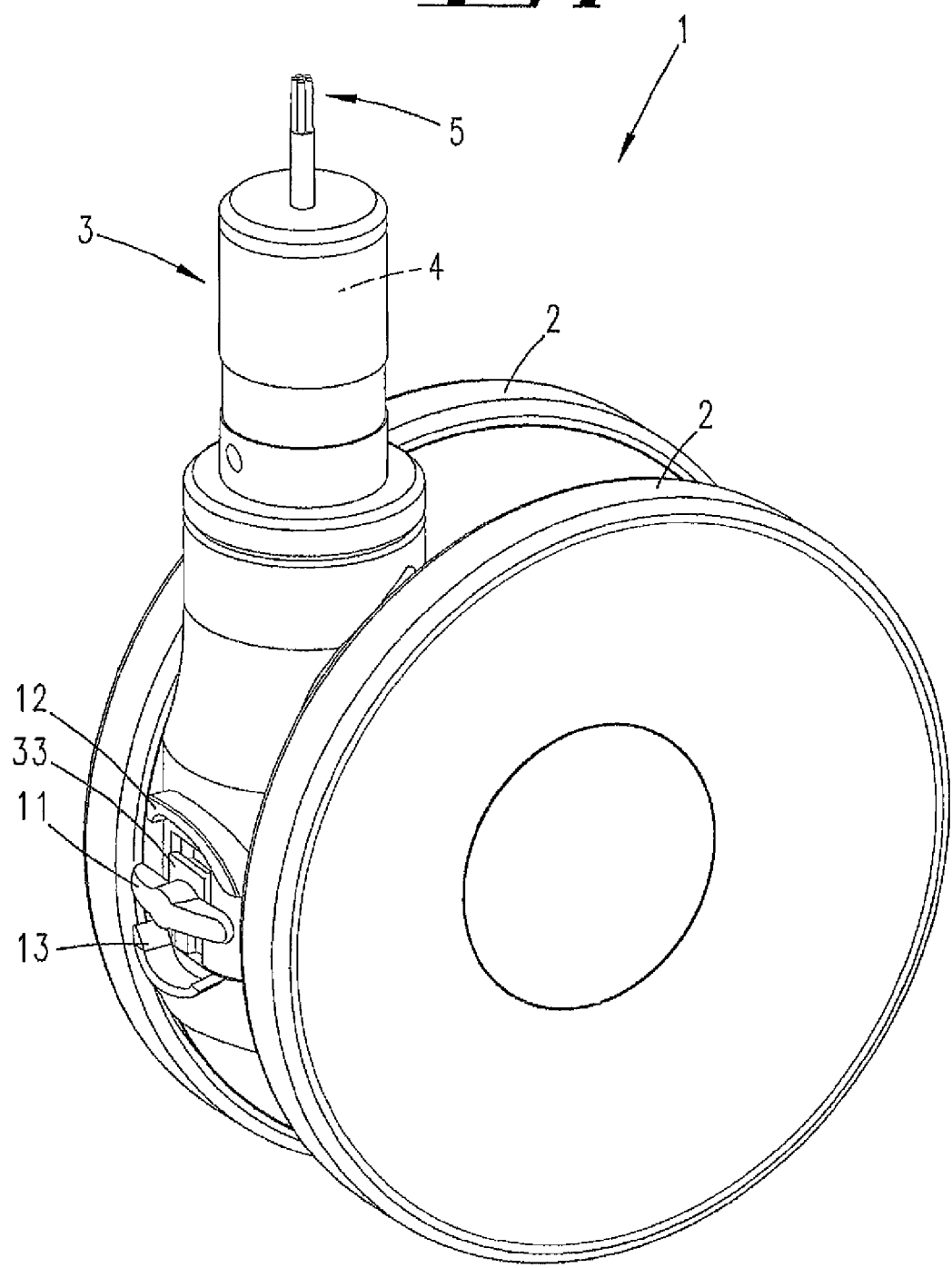
FIG. 1 shows a perspective view of a roller implemented as a double roller.

Referring in first instance in particular to FIGS. 1 to 12, a roller 1 formed as a double roller is described. The roller 1 has two wheels 2 and a mounting journal 3. As will be explained in greater detail below, an electric motor 4 is disposed in the mounting journal 3, the power connection 5 of the electric motor being led, preferably centrally, out of the top of the mounting journal 3. The electric motor 4 effects a linear drive movement of a linear part 6 (see FIG. 3) that acts on a transmission part 7 for vertical adjustment.

The transmission part 7 interacts with an activating part 10 via compression springs 8, 9.

As further shown in FIG. 1, a handle 11 for emergency release of the roller 1 is fitted to the housing of the roller 1, optionally on the mounting journal 3 or in extension thereof or, in the exemplary embodiment, in the lower region thereof. Above and below the handle 11, which is specifically formed as a rotary lever, abutments 12, 13 are formed on the housing.

Figure 2:
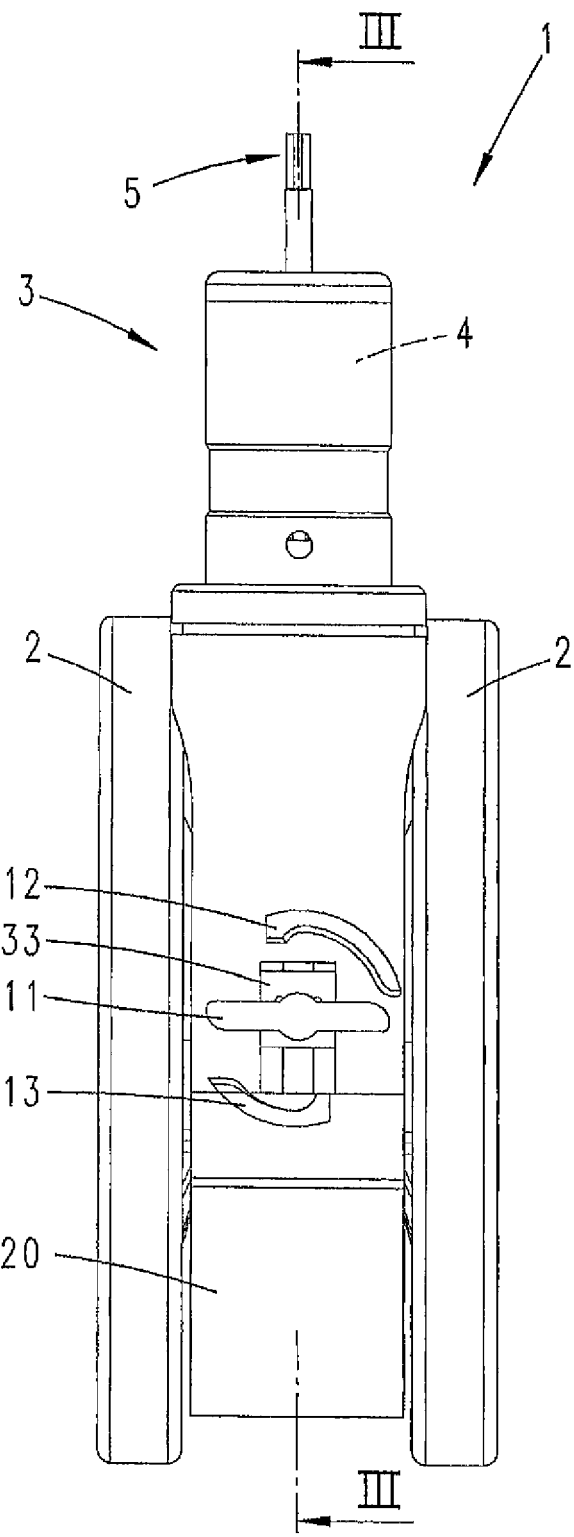
FIG. 2 shows a rear view of the roller according to FIG. 1.
Figure 14:
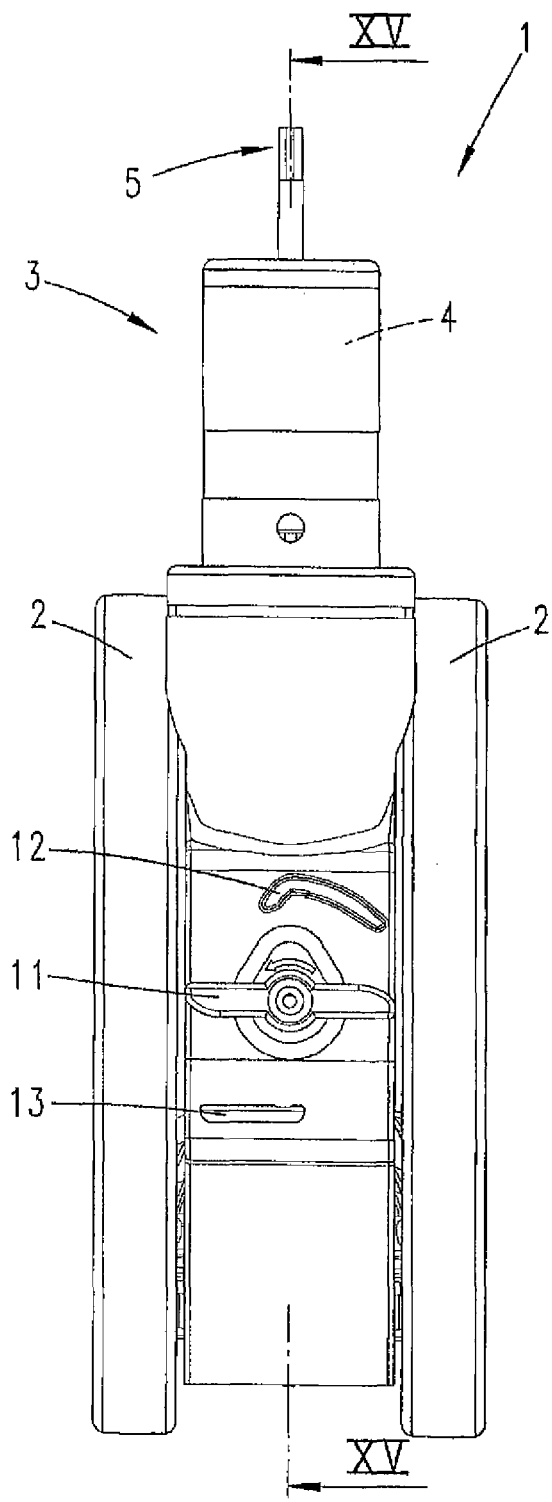
FIG. 14 shows a rear view of the roller according to FIG. 13 in the neutral position.

In FIG. 2 and also in FIG. 14, a rear view of the roller according to FIG. 1 is represented in a neutral position. In this position, there is no directional lock and no total lock. The roller can rotate freely and the wheels can roll freely.

Figure 3:
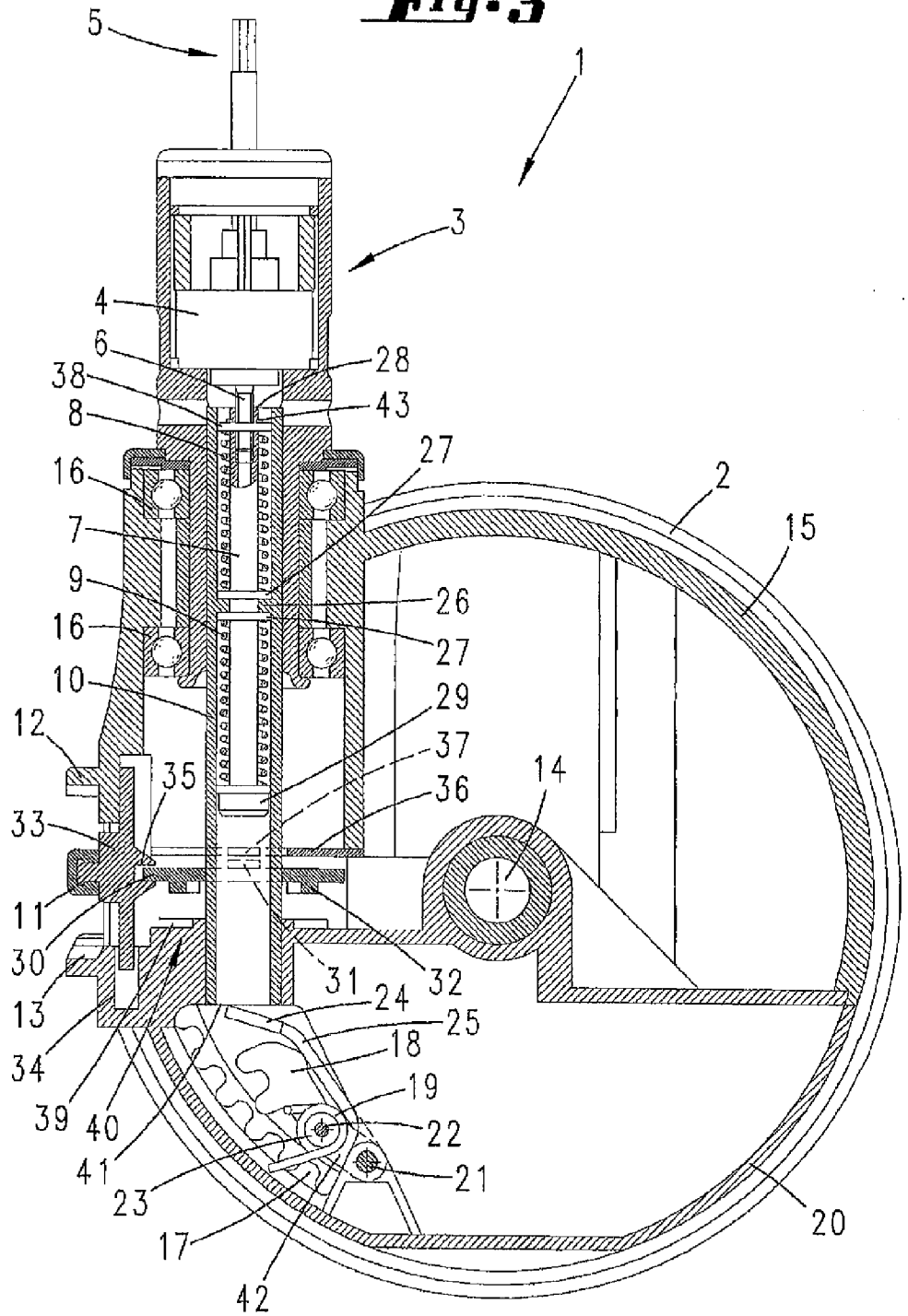
FIG. 3 shows a cross-section through the roller according to FIG. 1 and FIG. 2, sectioned along the line in FIG. 2.
Figure 4:
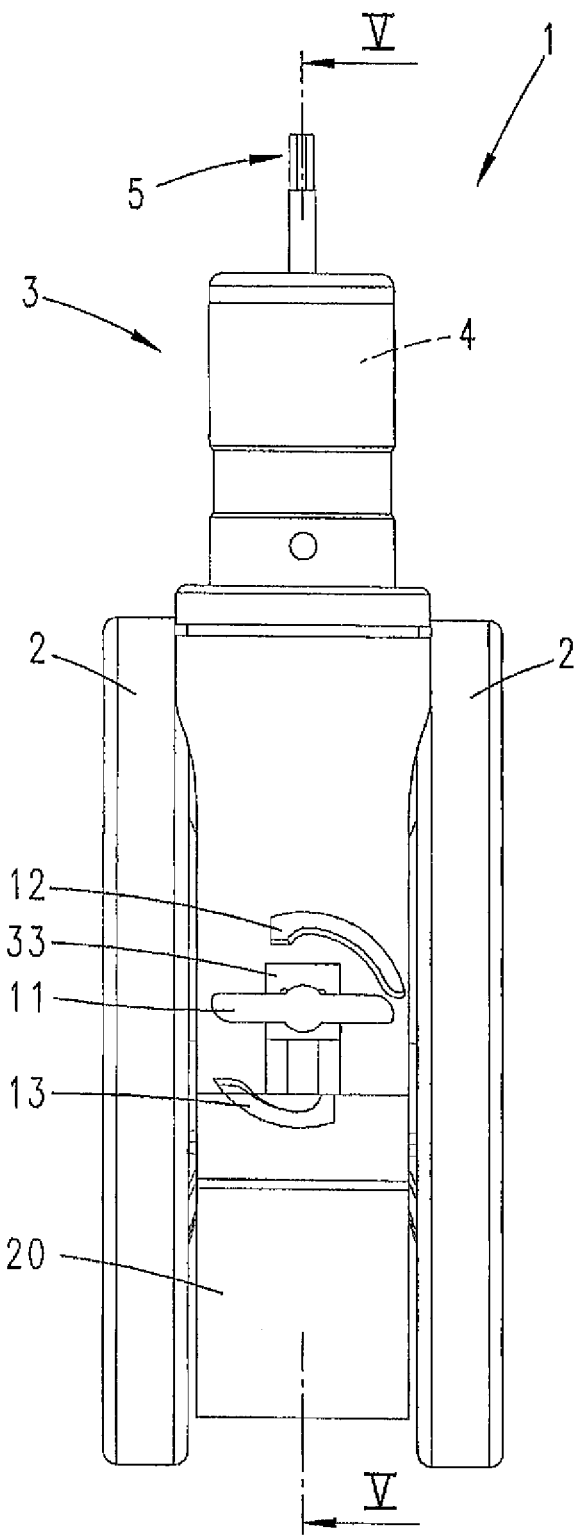
FIG. 4 shows an illustration according to FIG. 2 in the state of the directional lock.
Figure 15:
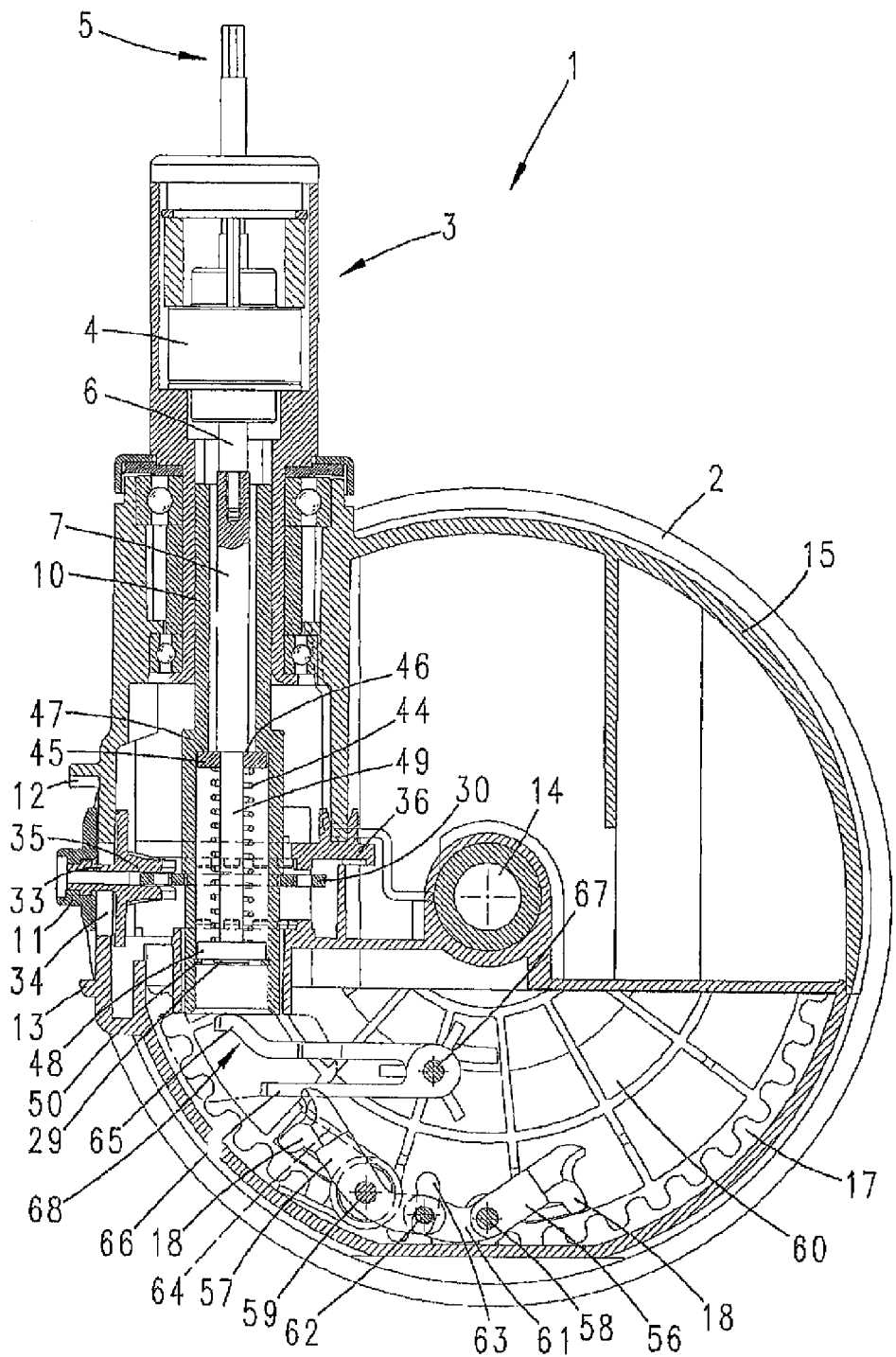
FIG. 15 shows a cross-section through the roller according to FIG. 13 and FIG. 14, sectioned in the plane XV-XV in FIG. 14.
Figure 16:
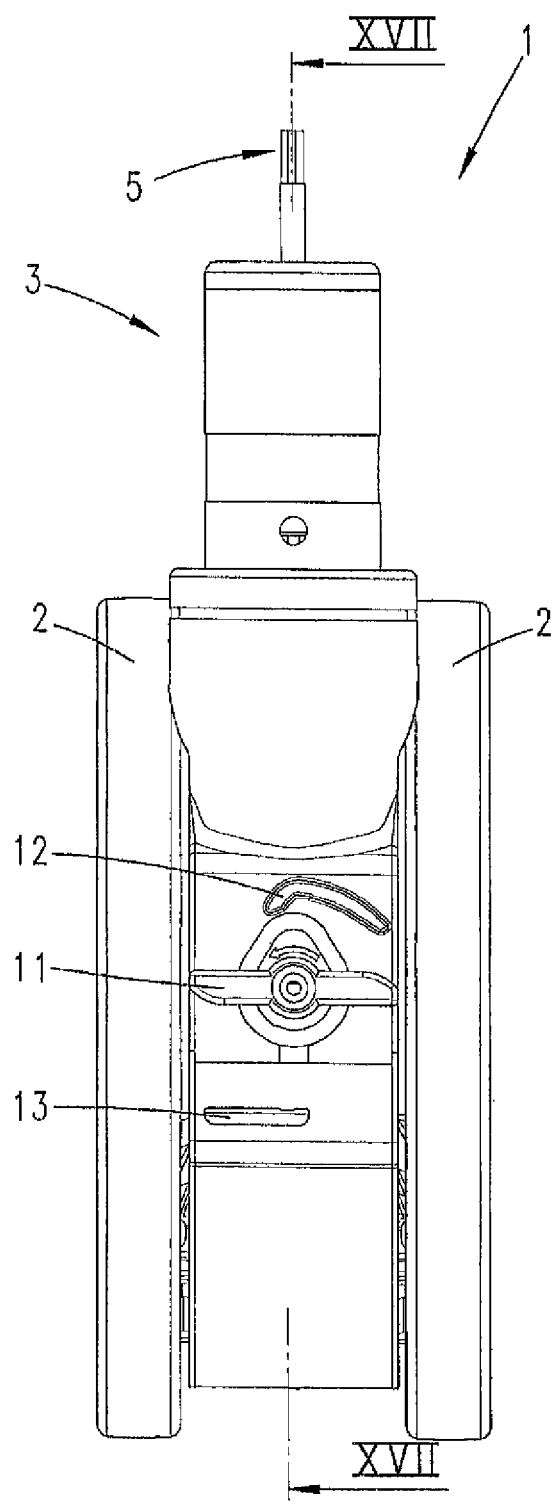
FIG. 16 shows an illustration of the roller according to FIG. 14 in a position corresponding to the directional lock.

Further referring to FIG. 3 and also, for example, to FIG. 15, it can be seen that the wheels 2 are disposed on an axle 14. The sectional view shows a central housing part 15 that is formed between the wheels 2.

The housing part 15 is arranged by means of antifriction bearings 16 to be rotatable relative to the mounting journal 3, which is stationary in the assembled state. The wheels 2 further comprise an internal toothing 17 provided for rotational locking. In interaction with an engagement part 18, for example, one engagement part per wheel, but also, if necessary, with two engagement parts per wheel (cf second embodiment), the internal toothing 17 forms a first part of the locking device in the exemplary embodiment. The engagement part 18 is biased into the release position according to FIG. 3 by a leg spring 19. The leg spring 19 is supported on the one hand on the engagement part 18 and on the other hand on an inner region of the housing part 15, namely on the bottom part 20 thereof, which in the exemplary embodiment is formed as a part of the housing part 15.

Furthermore, the engagement part 18 is held via an axle 21 so as to be rotatable in the housing 15 or the bottom part 20. The axle 21 is formed in a pivot part 43 which has two bearing receptacles 23 for the axle 21 and a further axle 22. The axle 22 supports the engagement part 18 on the leg [sic; pivot] part 42. An acting portion 24 is fixedly connected to the part that accommodates the bearing receptacle 23 and the axle 21. As is apparent, for example, from the illustration according to FIG. 10, the acting portion 24 is centered in the direction toward the axle 14 between two lateral acting portions 25. Each of the lateral acting parts 25 acts directly on one of the two engagement parts 18 associated with each wheel 2.

Except for the difference of two springs versus one spring, in particular the above-described designs of the two embodiments correspond to one another.

The activating part 10 is at least substantially tubular. Furthermore, the activating part 10 has a support flange 26 on the inside which serves as a support region, and on which, in the first embodiment, the compression spring 8 and also the compression spring 9 are supported. In the exemplary embodiment, supporting occurs by means of a washer 27.

The two springs 8, 9 provided in the first embodiment are arranged one above the other.

The lower spring 9 is supported by its upper end, and the upper spring 8 is supported by its lower end, on the activating part 10 by means of the support flange 26. The arrangement of the springs one above the other is provided without vertical overlap.

Figure 5:
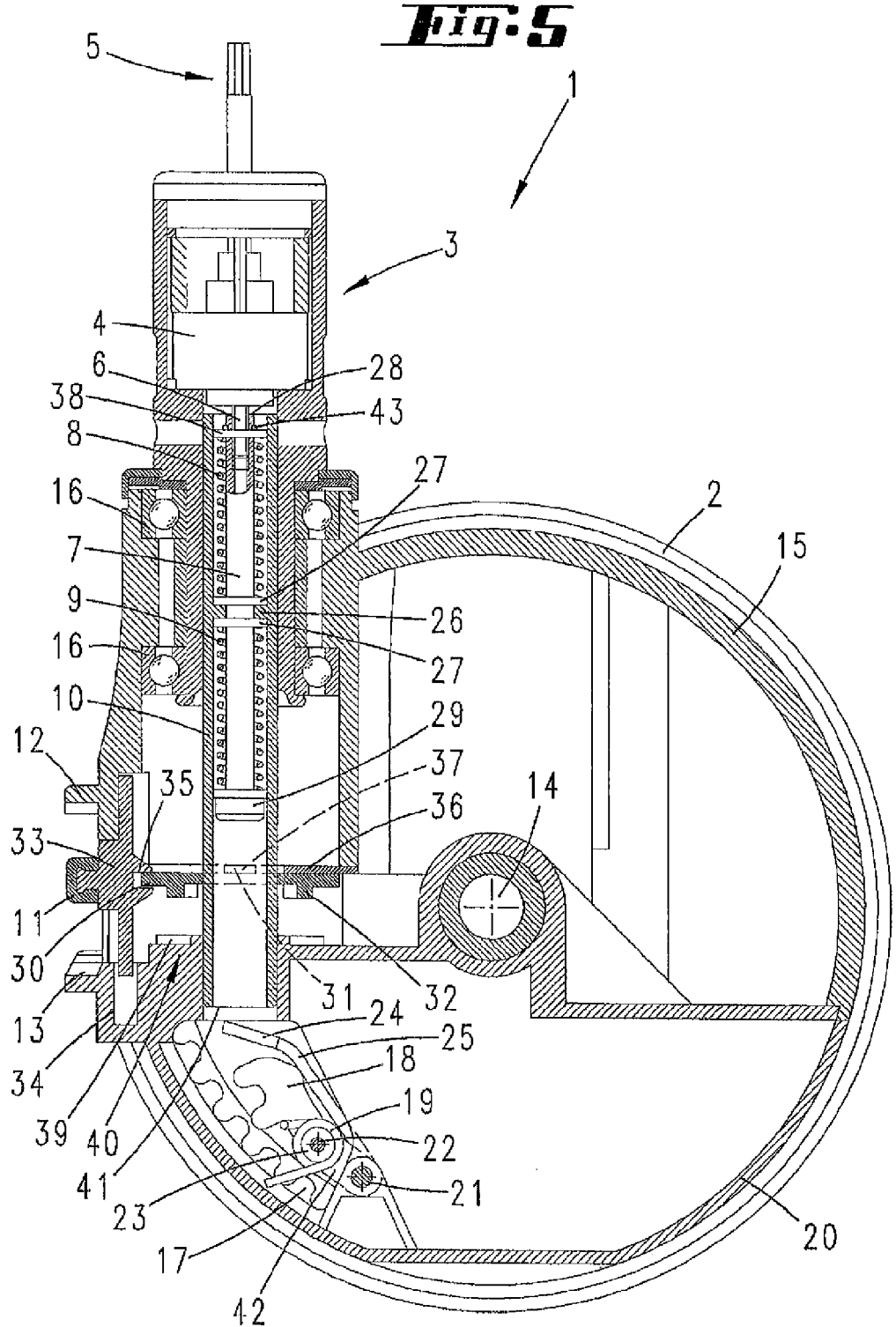
FIG. 5 shows a cross-section through the object according to FIG. 4, sectioned along the line V-V.

The upper spring 8 is used for moving the activating part 10 into the position corresponding to the total lock (see FIG. 7), and the lower spring 9 is used for moving the activating part 10 into the position corresponding to the directional lock (see FIG. 5).

The transmission part 7 extends within and coaxially with respect to the activating part 10. In both embodiments, the transmission part 7 has a substantially solid design, the transmission part having an internal thread associated with the upper end 28 thereof. The internal thread interacts with the external thread of the linear part 6. By a rotational movement of the rotor of the electric motor 4, which rotor is preferably formed here corresponding to a nut having an internal thread, the linear part 6 and therefore the transmission part 7 can thus be moved upwardly or downwardly. Therefore, the transmission part 7 is also moved up and down preferably only linearly, thus, without rotating.

On the underside, the transmission part 7 has a head 29 that is formed corresponding to a screw head. The head 29 can also be used to supplement the guidance within the activating part 10. A further guiding effect is provided by the inner surface of the support flange 26, through which the transmission part 7 passes axially in a freely movable manner.

On the upper side of the head 29, a further washer is arranged which, with regard to the second embodiment, is also designated as a support part 48, and on which the underside of the compression spring 9 is supported.

As can be seen, the support of the spring 8 on the activating part 10 and/or the support of the spring 9 on the activating part 10 and/or the support of the compression spring 44, whether in the lower or upper region, on the activating part 10 can in each case be passed through by the transmission part 7.

Furthermore, the activating part 10 is fixedly connected, in any case in the vertical direction, to a movement extension formed as a cantilever 30. The cantilever 30 can, for example, also be welded to the activating part 10. In the exemplary embodiment, formations 31 for directional locking are formed on the upper side on the cantilever 30 (see FIGS. 10 and 11), and on the underside (see FIG. 12) projections 32 are formed for directional locking in the case of the total lock. The arrangement of the cantilever 30 (in this respect, both embodiments are in accordance with one another) is provided with vertical spacing from the lower and/or upper end of the activating part 10. Furthermore, the arrangement of the cantilever 30 is preferably provided to be eccentric with regard to the vertical height of the activating part 10, namely, preferably closer to the lower end of the activating part 10. The spacing of the cantilever 30 from the lower end of the activating part 10 once again preferably corresponds approximately to a range of one to three times the (outer) diameter of the activating part 10, and, if applicable, in the case of a difference, with regard to the lower region thereof.

Due to its fixed connection to the activating part 10, the cantilever 30 moves together with the activating part in the vertical direction.

Furthermore, the handle 11 is connected to the cantilever 30, in particular by means of a sliding part 33 in the first embodiment. The sliding part 33 is accommodated so that it is movable only in the vertical direction in guides 34 that are fixed on the housing and act in particular in the lateral direction.

In the exemplary embodiment, the sliding part 33 is connected to the cantilever 30 by a positive locking connection 35. The connection is in any case established in such a manner that a movement of the sliding part 33 in the vertical direction is transmitted directly to the cantilever 30, and therefore to the activating part 10.

The handle 11, which is arranged to be rotatable relative to the sliding part 33 or, where applicable, is arranged directly on the sliding part so as to be rotatable relative thereto, can be used for the emergency release if for example, the electric motor 4 cannot be actuated, as explained hereinafter in greater detail.

The roller 1 can be operated as follows:

Starting from the position according to FIGS. 1 to 3, the linear part 6 can be moved by means of the electric motor 4 in such a manner that a vertical movement of the transmission part 7 takes place; compare the difference in the position of the transmission part 7 in FIG. 3 and in FIG. 5. Since there is a tendency toward a reduction in the spacing between the head 29 of the transmission part 7 and the support flange 26 of the activating part 10, a force is hereby exerted on the activating part 10 via the spring 9, which force moves the activating part vertically upwardly. The cantilever part 30, which is fixedly connected to the activating part 10, thus likewise moves vertically upwardly and interacts with a directional locking part 36 that is fixedly mounted on the housing. In the directional locking part 36, formations [sic; recesses] 37 are formed in which the formations 31 (detent recesses) engage upon corresponding alignment of the wheels 2 of the roller 1, so that the directional lock is achieved with regard to a selected direction.

Figure 7:
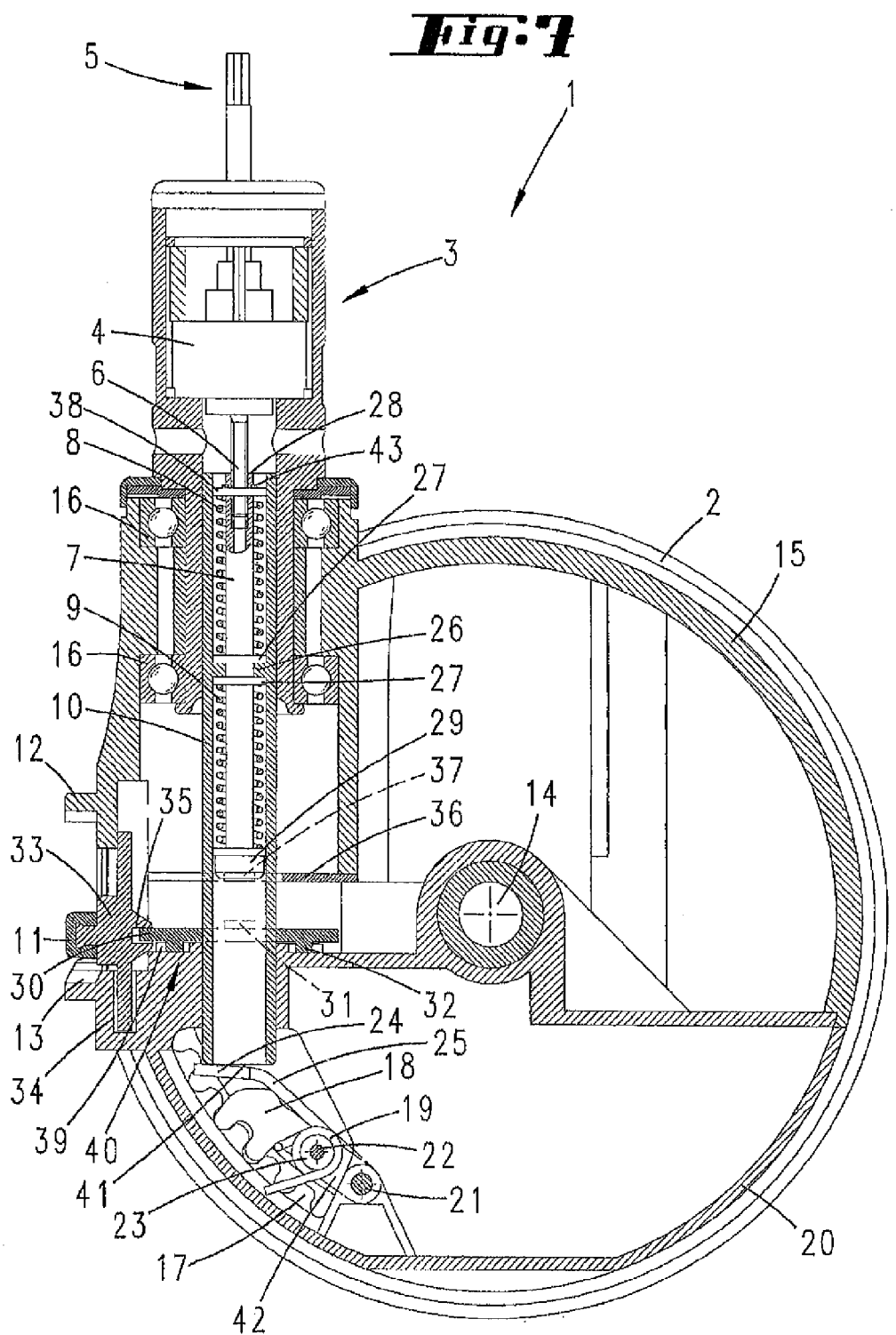
FIG. 7 shows a cross-section through the object according to FIG. 6, sectioned along the line VII-VII in FIG. 6.
Figure 8:
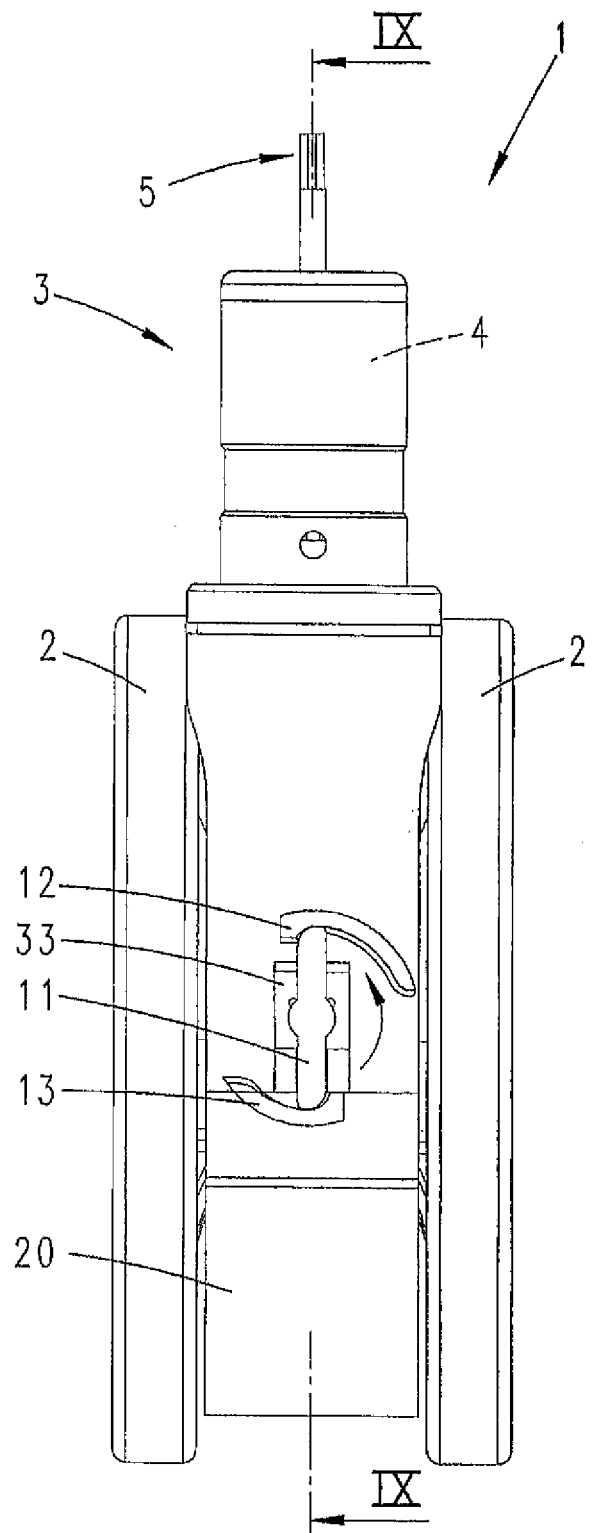
FIG. 8 shows an illustration of the roller according to FIG. 1 and FIG. 2, 4 or 6, after completion of the emergency release.

A linear movement of the linear part 6 of the electric motor 4 in the opposite direction causes a downward displacement of the transmission part 7, thus from the position in FIG. 3 or FIG. 5 into the position according to FIG. 7. The spring 8 causes a downward movement of the activating part 10, the spring being axially fixedly supported on the transmission part 7 by the disc 38, which, with regard to the second embodiment, is also designated as support part 45, and the retaining element 43 as abutment. A front end 41 of the activating part 10 thus acts on the acting part 24, thereby moving the engagement part 18 against the action of the leg spring 19 into the engagement position according to FIG. 7.

At the same time, the cantilever part 30 moves downwardly together with the activating part 10. The projections 32 formed on the underside of the cantilever engage with the holding recesses 39 (projections) of the locking part 40, and thus effect the directional lock. As can be seen, one direction, which is then locked, can be provided out of a multiplicity of different directions. In contrast, in the case of the single rotational lock (see in particular FIG. 5 and the related description), it can be provided to lock (in each case) only one direction. However, as an alternative, as described, for example, for the second embodiment, it is also possible to lock only one direction from a multiplicity of directions.

The locking part 40 is fixedly mounted on the housing.

With regard to the fact that it is necessary to provide for the possibility that the electric motor 4 cannot be actuated, for example because of a power outage, precaution is taken that the directional lock or the total lock can be released by hand.

This merely requires rotating the handle 11, which is disposed on the sliding part 33 so as to be rotatable relative thereto. If, as a result of the directional lock, the handle 11 is in the position according to FIG. 4, by rotating it counterclockwise, the handle can be supported on the abutment 12 that has a corresponding supporting surface that preferably is not arc-shaped, whereby, without changing the position of the transmission part 7, the activating part 10 is moved vertically downwardly, thereby compressing the spring 9.

Figure 6:
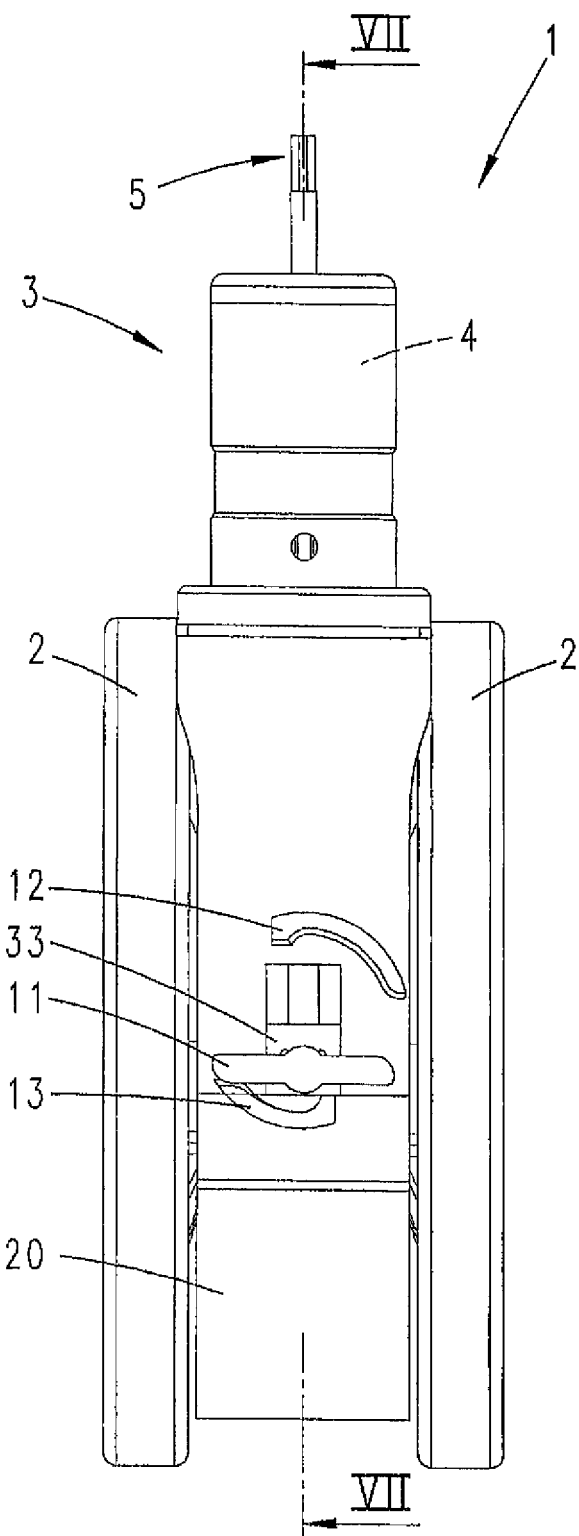
FIG. 6 shows an illustration according to FIG. 2 in the state of the total lock.

If the roller 1 is in the total lock according to FIG. 6, the handle 11, by rotary actuation in counterclockwise direction, can be supported in the same manner on an abutment, now the lower abutment 13, so that the activating part 10 is moved upwardly against the action of the spring 8 without changing the position of the transmission part 7. The position after an emergency release from the total lock is illustrated in FIG. 9a. The handle position corresponding to an emergency release can be latched.

Figure 9:
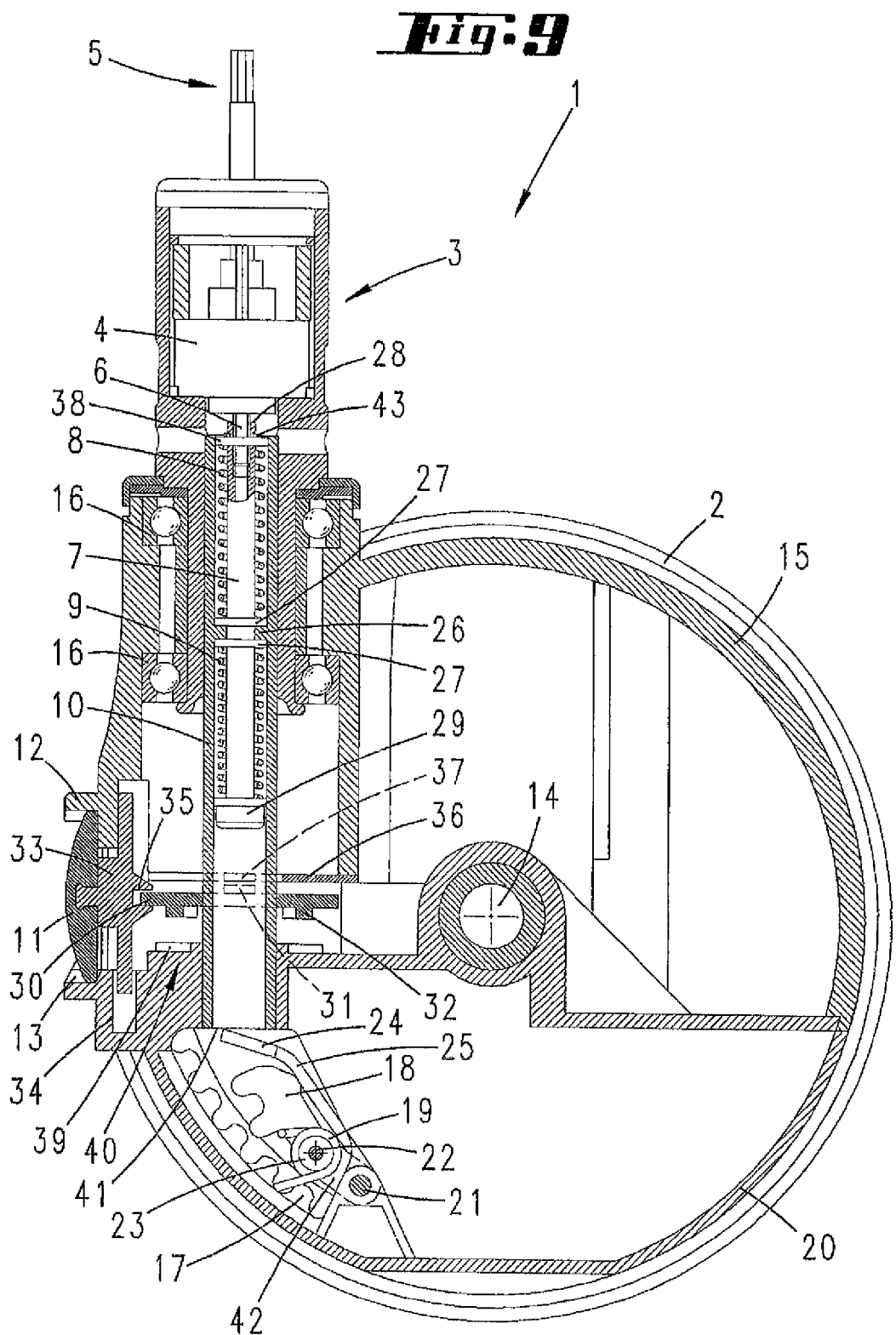
FIG. 9 shows a cross-section through the object according to FIG. 8, sectioned along the plane IX-IX, after an emergency release from the position according to FIG. 5.
Figure 9A:
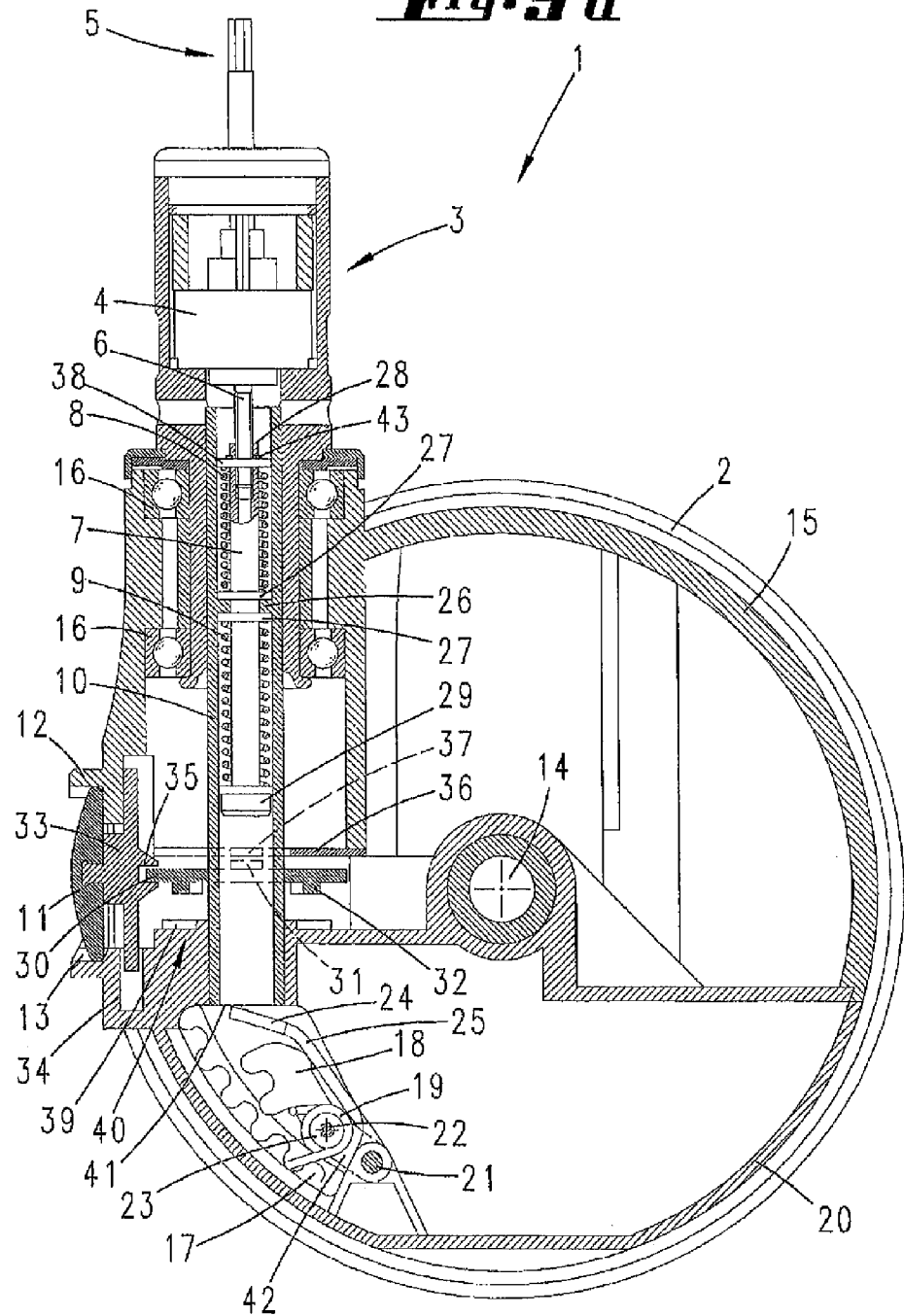
FIG. 9*a* shows an illustration according to FIG. 9, after an emergency release from the position of FIG. 7.
Figure 10:
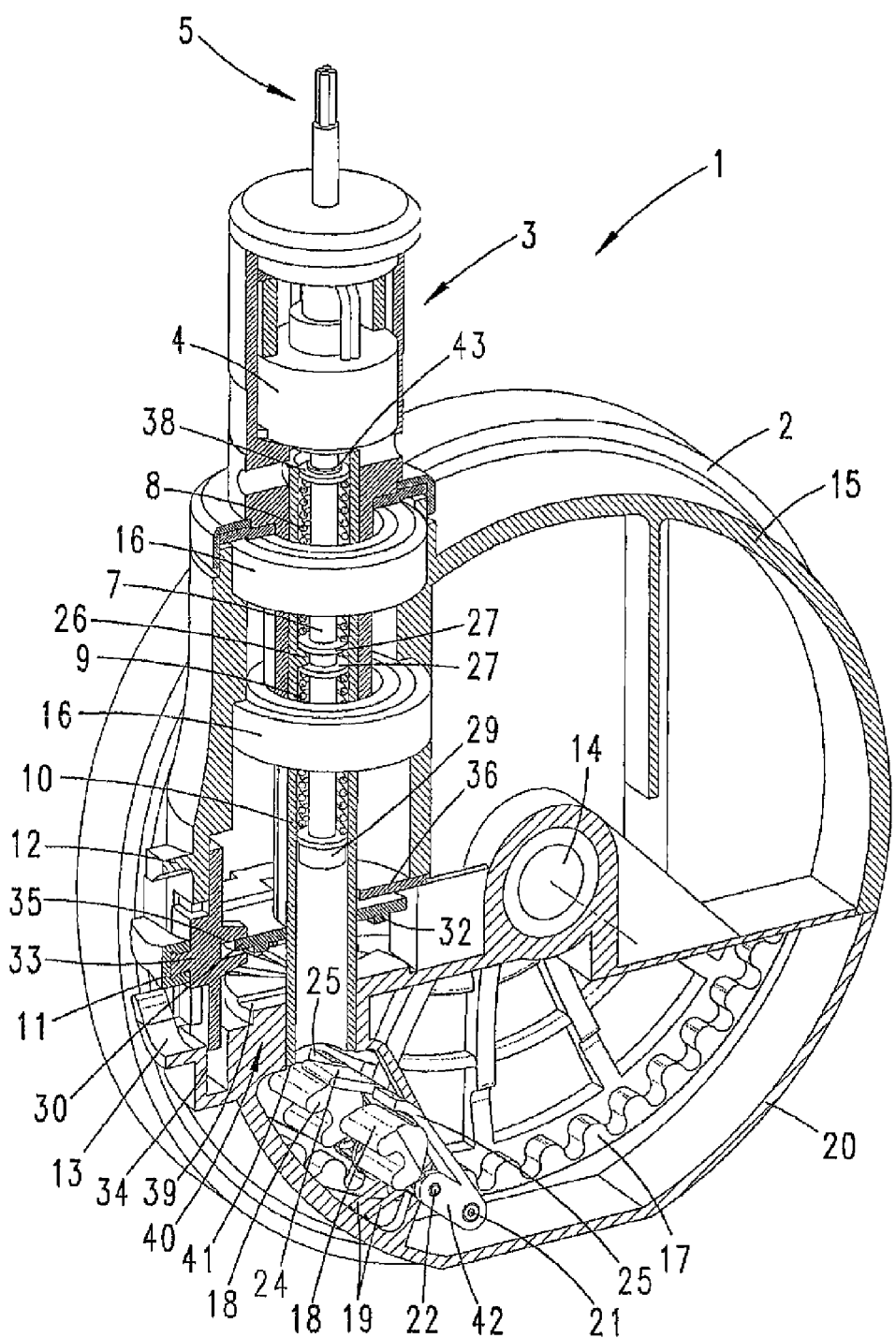
FIG. 10 shows a perspective cross-sectional view of the roller according to FIGS. 1 to 3.

The position of the activating part 10 and of the transmission part 7, which does not move during any emergency release, is shown in FIGS. 9 and 9a.

With regard to its rotatability, the handle 11 can be spring-biased into its neutral position according to FIG. 1.

In order to bring the handle back into its initial position, manual actuation of the handle into its neutral position is required.

The further embodiment is described with reference in particular to FIGS. 13 to 24.

A significant difference from the previously described embodiment is that only one spring is provided between the transmission part 7 and the activating part 10, namely, the compression spring 44.

With regard to support, the compression spring 44 can be alternatingly supported on the transmission part 7 or the activating part 10.

In the upper region, the compression spring is supported in first instance on the transmission part 7 itself by means of a support part 45. For this purpose, in particular a counter limit stop 46 for the support part 45 is formed on the transmission part. Furthermore, the counter limit stop 46 is preferably achieved by tapering the shank diameter of the transmission part 7. The shoulder which is thus formed forms the counter limit stop for the support part 45 in the upward direction.

Figure 17:
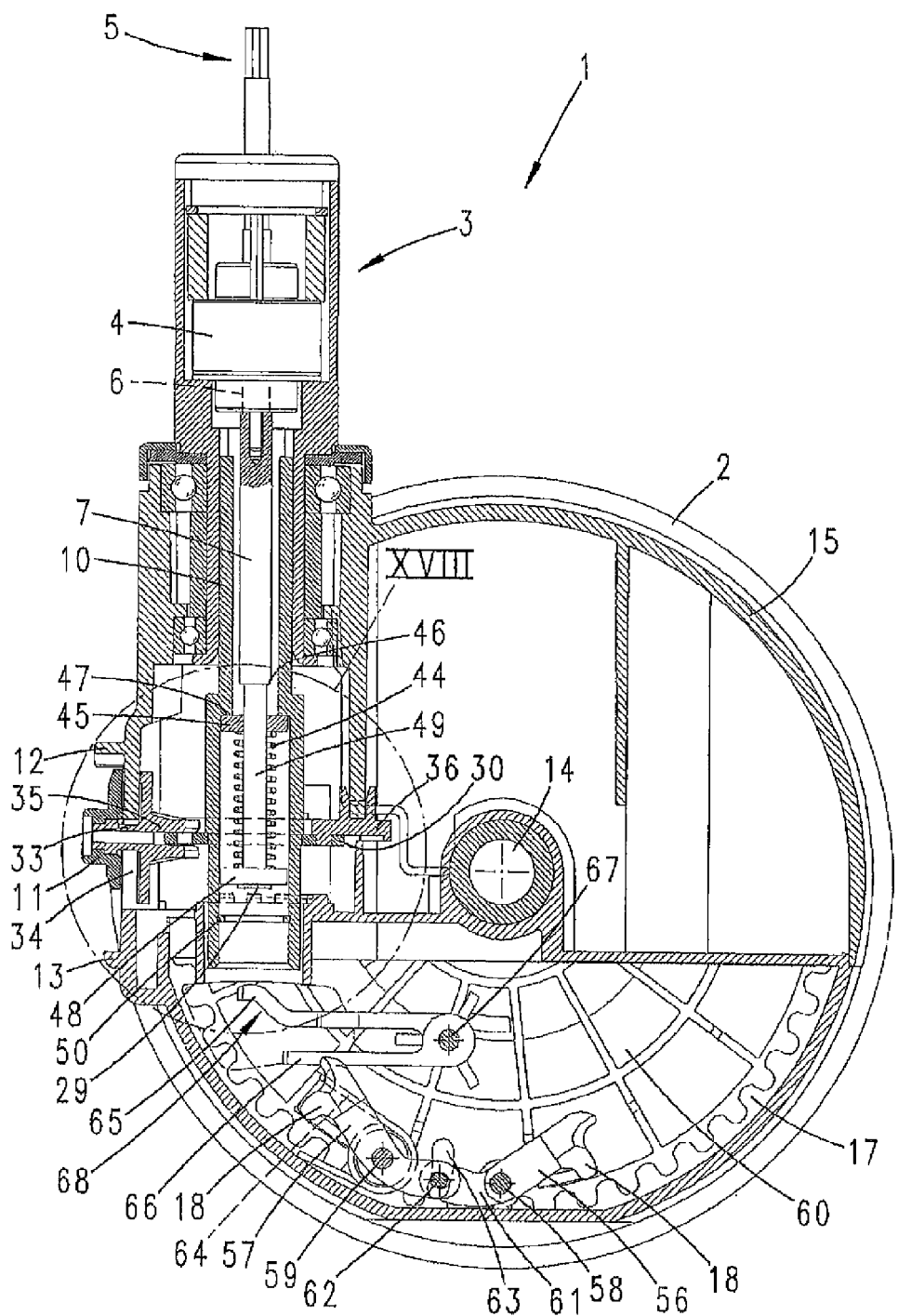
FIG. 17 shows a cross-section through the roller according to FIG. 16, sectioned in the plane XVII-XVII in FIG. 16.

However, when the transmission part 7, starting from the position in FIG. 15, moves further upwardly, for example into the position in FIG. 17, the support part 45 cannot follow the counter limit stop 46 on the transmission part 7, and instead remains on or reaches the support on the activating part 10. In particular, a counter limit stop 47 is formed for this purpose on the activating part 10, which counter limit stop is in particular achieved by a step resulting from an increase of the clear inside dimension of the activating part 10.

In this respect, during a movement of the transmission part 7 from a position corresponding to the neutral position into the directional lock, a change in the support of the compression spring 44 takes place, namely, from the support on the transmission part 7 to the support on the activating part 10. The support part 45 switches from a support on the counter limit stop 46 to a support on the counter limit stop 47. At the same time, if it has not already taken place previously, a corresponding change can also take place in the lower region of the compression spring 44. The support part 48 and therefore the compression spring 44 are in any case no longer supported on the limit stop 50, but rather, only on the head 29 and therefore on the transmission part 7 itself.

The support part 48, the same as the support part 45, is displaceable relative to the transmission part 7, in any case in the region of the shank portion 49 that has a thinner diameter.

Furthermore, here as well, a limit stop is formed on the underside of the activating part 10, which limit stop cannot be overrun by the support part 48. This is the limit stop 50, which can be formed, for example, by a circlip that is inserted at this location in an inner groove of the transmission part 10. In this respect, here as well a support region is formed through which the transmission part 7 can pass through—in this case, in the downward direction.

In addition, an overlap on the front end engages over the support part 48 by means of the head 29 of the transmission part 7, which has already been discussed and also described in connection with the first embodiment. Thus, the support part 48 cannot run over a front end of the transmission part 7.

If, again approximately corresponding to FIG. 17, the transmission part 7 is now moved upwardly from the position in FIG. 15, the support part 48 is carried along accordingly. Thus, the compression spring 44 is shortened and its compressive force is increased, unless, as intended in first instance, the activating part 10 is moved upwardly as a result of the spring force. This upward movement by means of the spring force occurs via the support part 45 and the counter limit stop 47 on the activating part 10.

Figure 18:
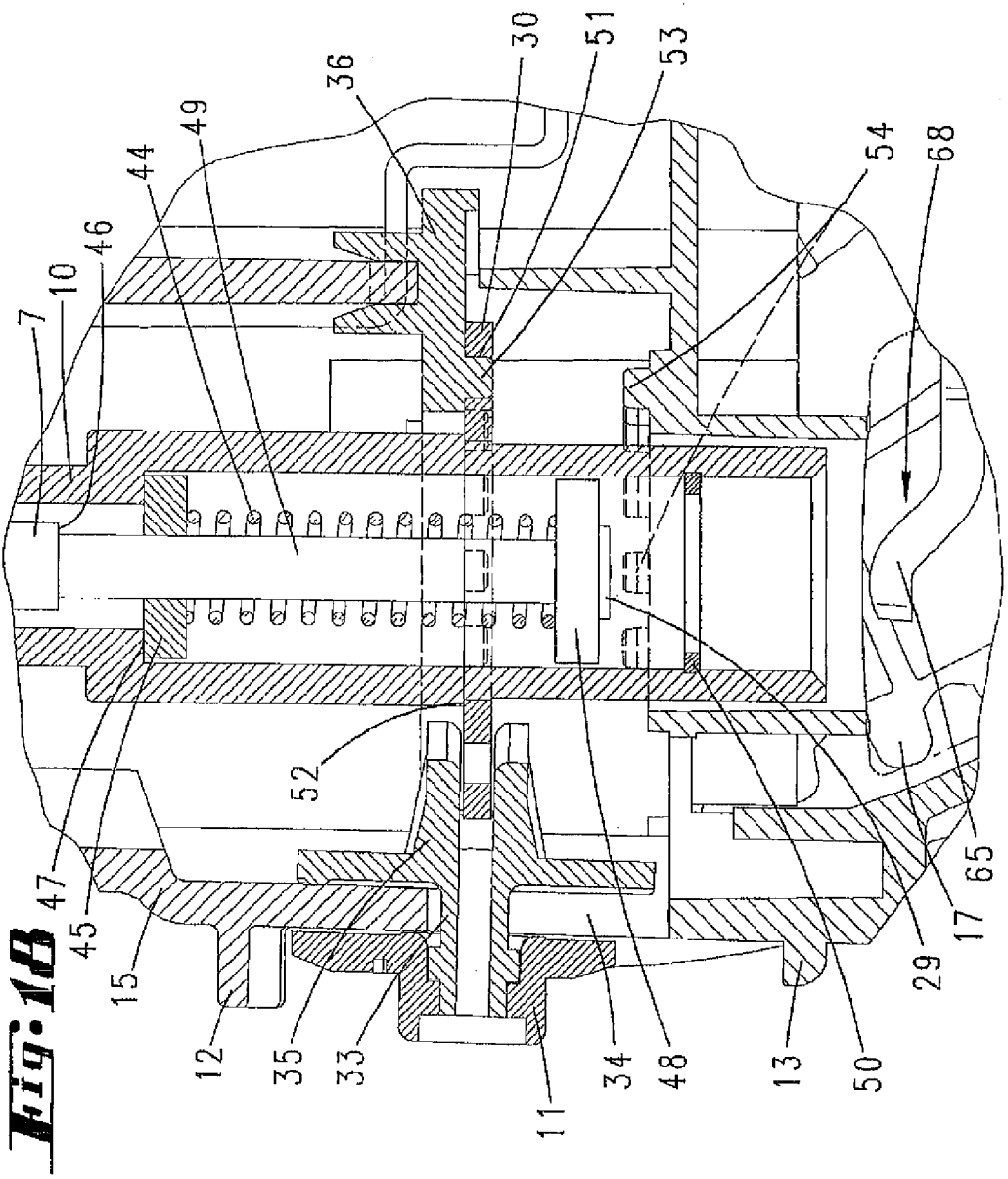
FIG. 18 shows an enlarged detail of the region XVIII in FIG. 17.
Figure 19:
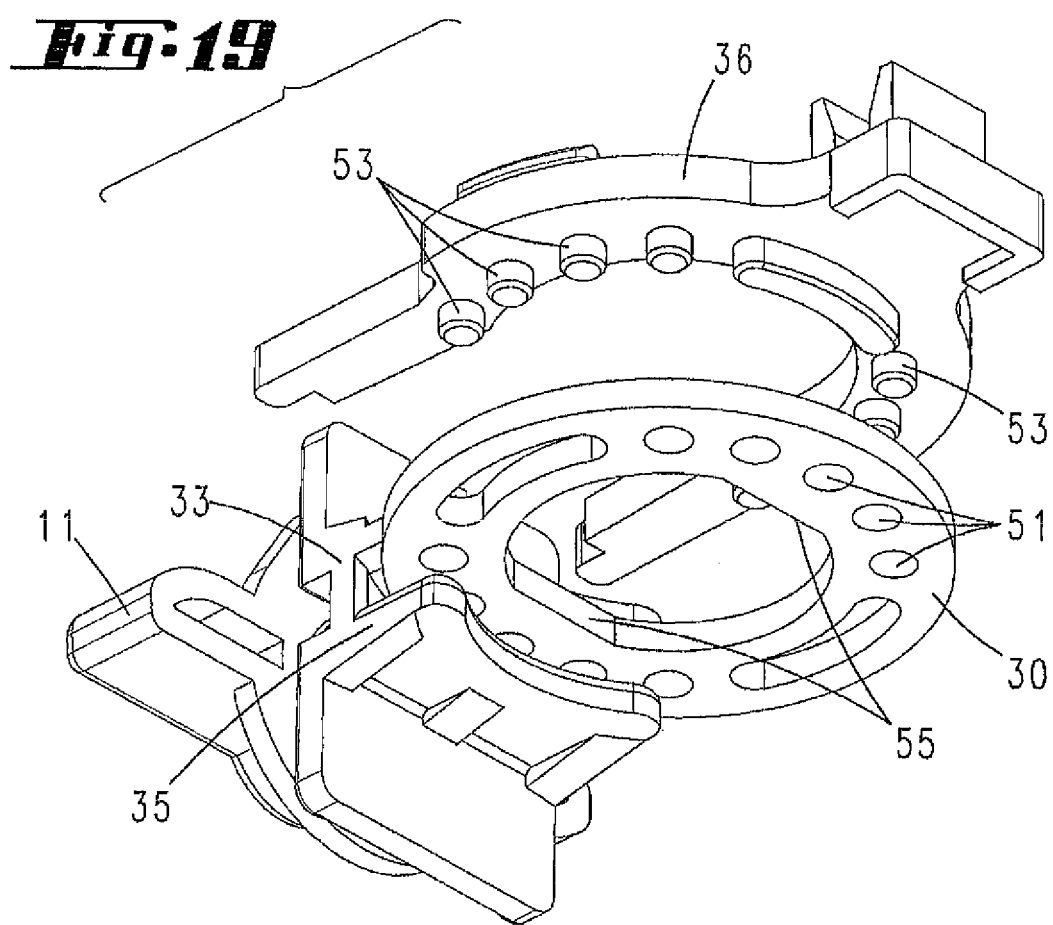
FIG. 19 shows a perspective illustration of a detail of the parts interacting with regard to the directional lock.
Figure 20:
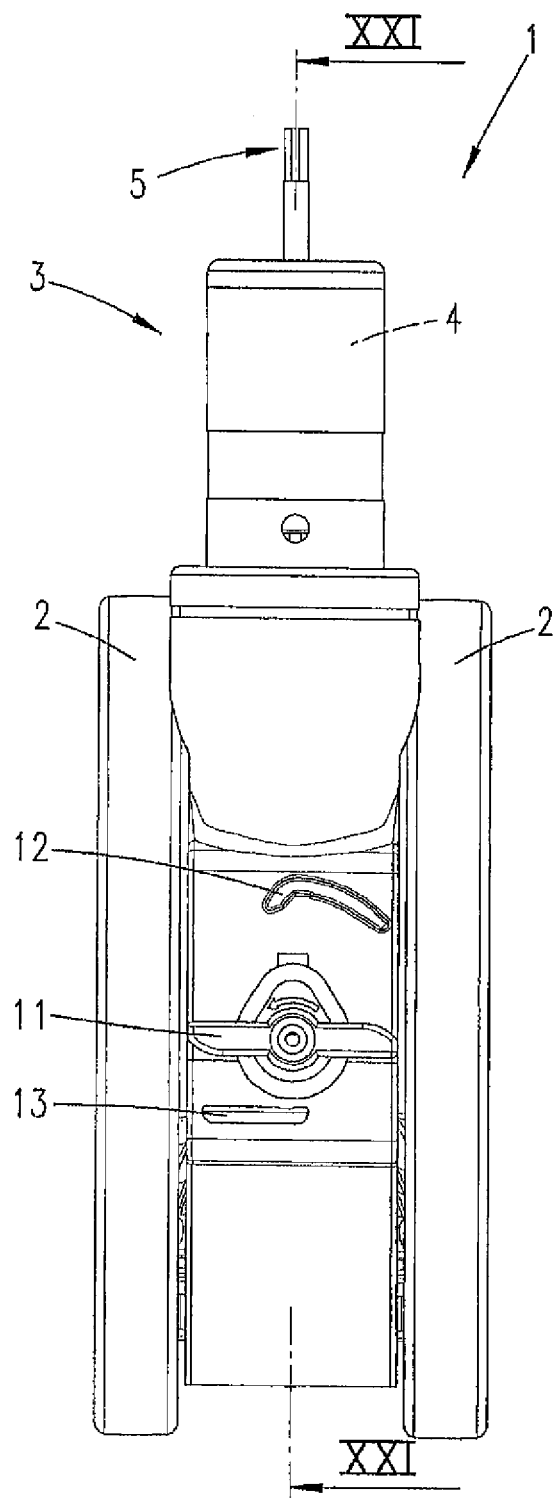
FIG. 20 shows an illustration of the roller according to FIG. 14 in a position corresponding to the total lock.

Referring to FIGS. 18 and 19, the structure and the interaction between the parts for achieving the directional lock are further explained.

Also in accordance with the embodiment described in first instance, a cantilever 30, which in this embodiment has engagement holes 51, is connected to the activating part 10. Accordingly, the directional locking can take place from a plurality of possible directions. In this embodiment as well, the cantilever 30 is enclosed on one side by a positive locking part 35 on which the handle 11 is mounted outside the housing 15. In the region of a narrowing (preferably cylindrical) outer diameter of the activating part 10, the cantilever 30 is connected fixedly, in any case with regard to a vertical movement, to the activating part 10. As can be seen, the cantilever is already connected at the top by the step 52 formed due to the narrowing. Furthermore, with regard to a downward movement, the cantilever can also be connected, for example, by a shrink-fit connection, or welding. or any other fixed connection.

In this embodiment, the directional lock 36 which is fixedly mounted on the housing is provided with downwardly facing engagement projections 53. Accordingly, the engagement projections engage in the engagement holes 51 of the cantilever 30 when they move toward one another.

The same as in the first embodiment, as a result of the directional lock, the housing 15, which due to the antifriction bearings 16 is in principle rotatable relative to the mounting journal 3 and therefore in particular relative to the activating part 10, is rotationally locked to the activating part 10.

With regard to a total lock, corresponding engagement projections 54 are also formed on the underside of the cantilever 30, corresponding to a position of the total lock of the activating part 10. As can be seen, these engagement projections can preferably be formed as one piece with the corresponding housing part.

As is apparent in particular from FIG. 19, the cantilever 30, which preferably is disc-like, can have an inner contour that deviates from circularity. Flat portions 55 can be provided, which preferably face one another. The flat portions 55 can interact with corresponding flat portions on the outer contour of the transmission part 10, which is not illustrated in detail.

In this embodiment as well, the positive locking part 35 is accommodated in a guide 34 of the housing, thereby forming a sliding part 33. The positive locking part is thus movable relative to the housing. In doing so, it correspondingly carries along the rotatably connected handle 11 vertically, which handle, however, is otherwise fixedly connected to the sliding part or the cantilever 30.

Furthermore, for a total lock, the activating part 10 acts on the overall four engagement parts 18 provided in the second embodiment.

The engagement parts 18 are each formed on lever parts 56 and 57, respectively, which are fixedly mounted in the housing via axles 58, 59. The corresponding housing part 60, which, as can be seen here, is also reinforced in a grid-like manner, is stationary, while the internal toothing 17 correspondingly revolves together with the wheel.

The two lever parts 56, 57 are connected via a pivot joint 61 at their mutually facing ends. A corresponding pivot joint axle 62 can move substantially in the radial direction in an elongated hole 63.

Figure 23:
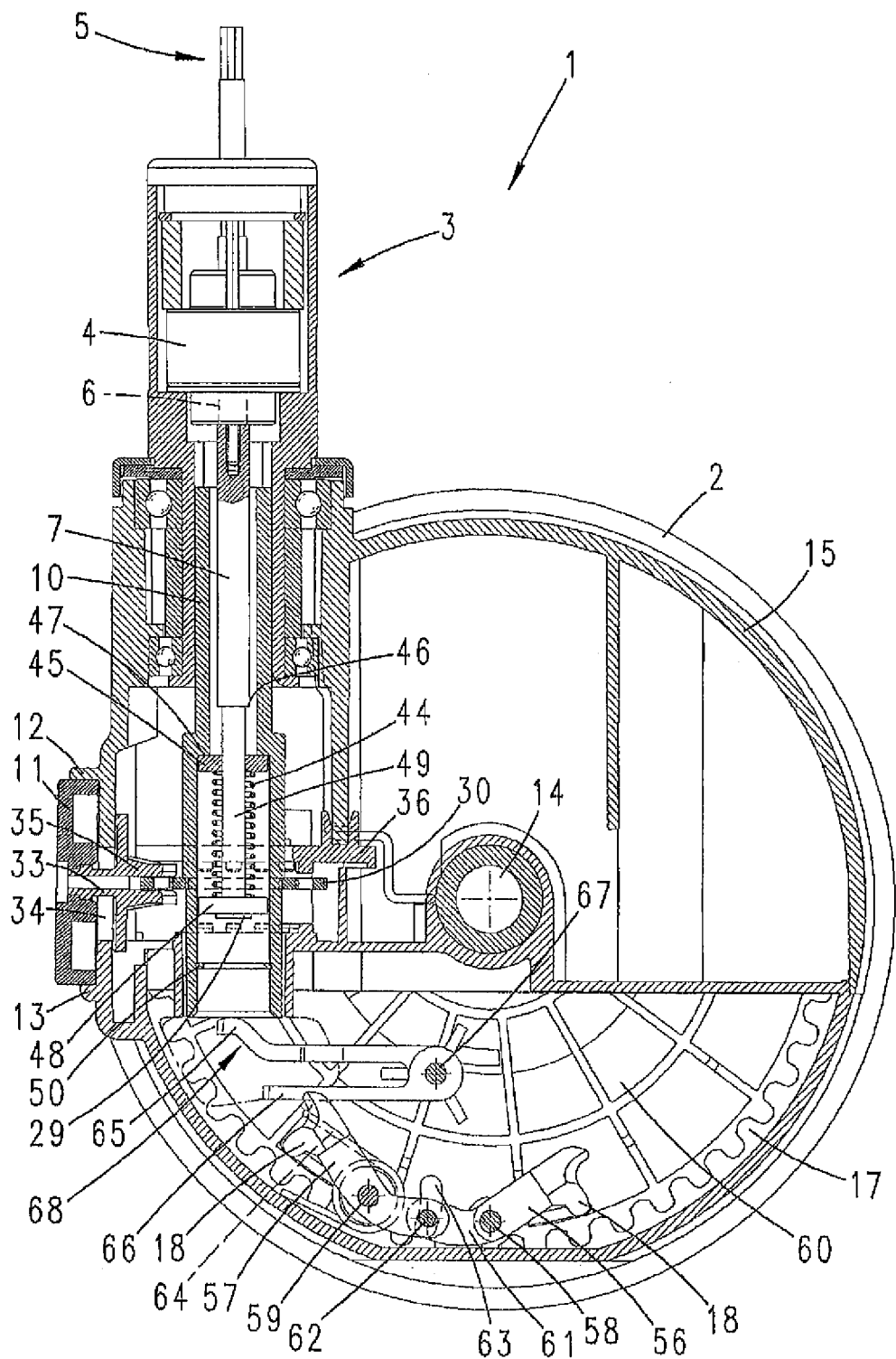
FIG. 23 shows a cross-section through the roller according to FIG. 22, sectioned in the plane XXIII-XXIII, after an emergency release from the position in FIG. 17.
Figure 23:
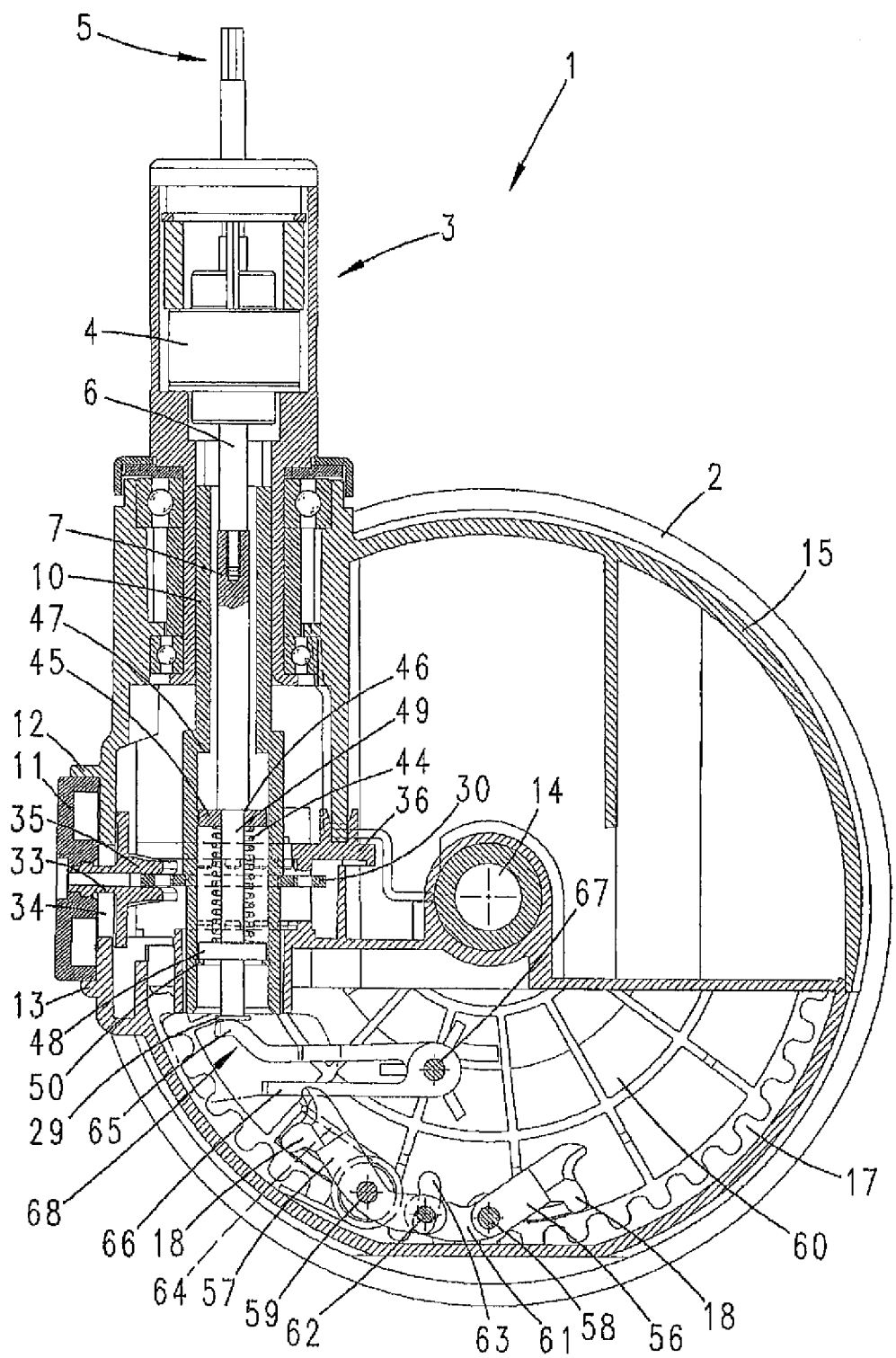
Figure 24:
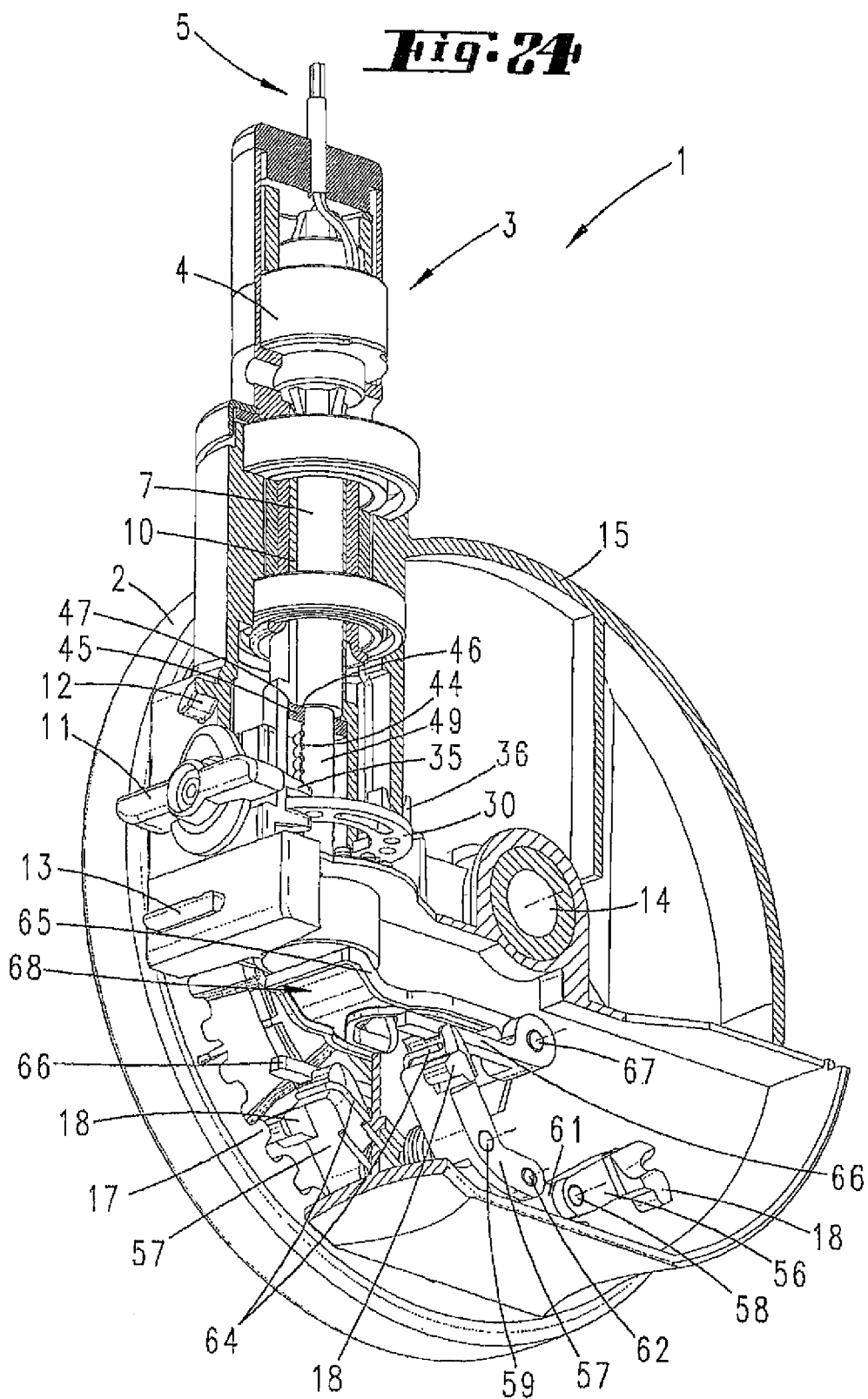
FIG. 24 shows a perspective cut-away illustration of the embodiment in FIGS. 13 and 14 in the position according to FIG. 14.
Figure 25:
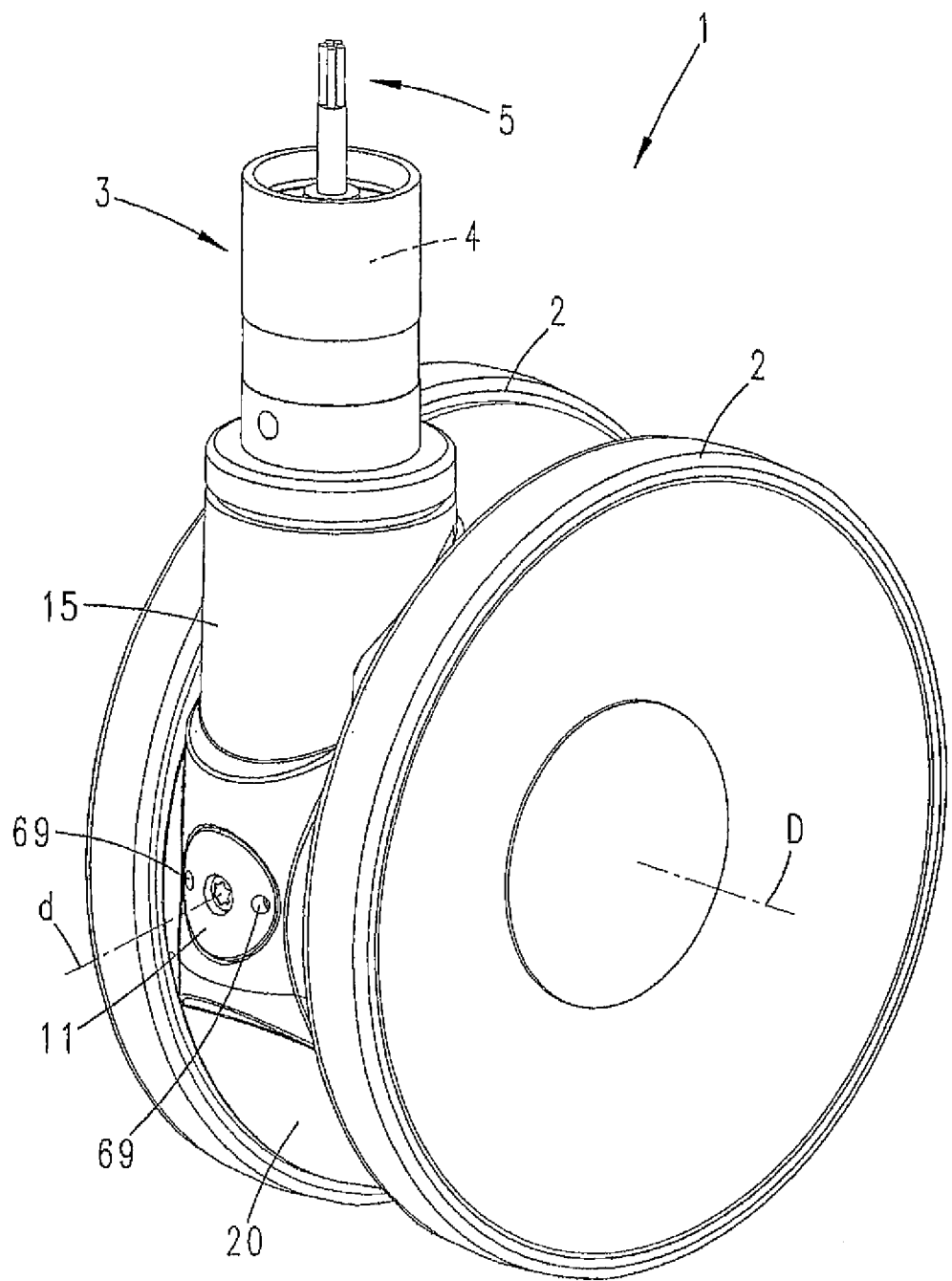
FIG. 25 shows a perspective illustration of a roller in a further embodiment.
Figure 26:
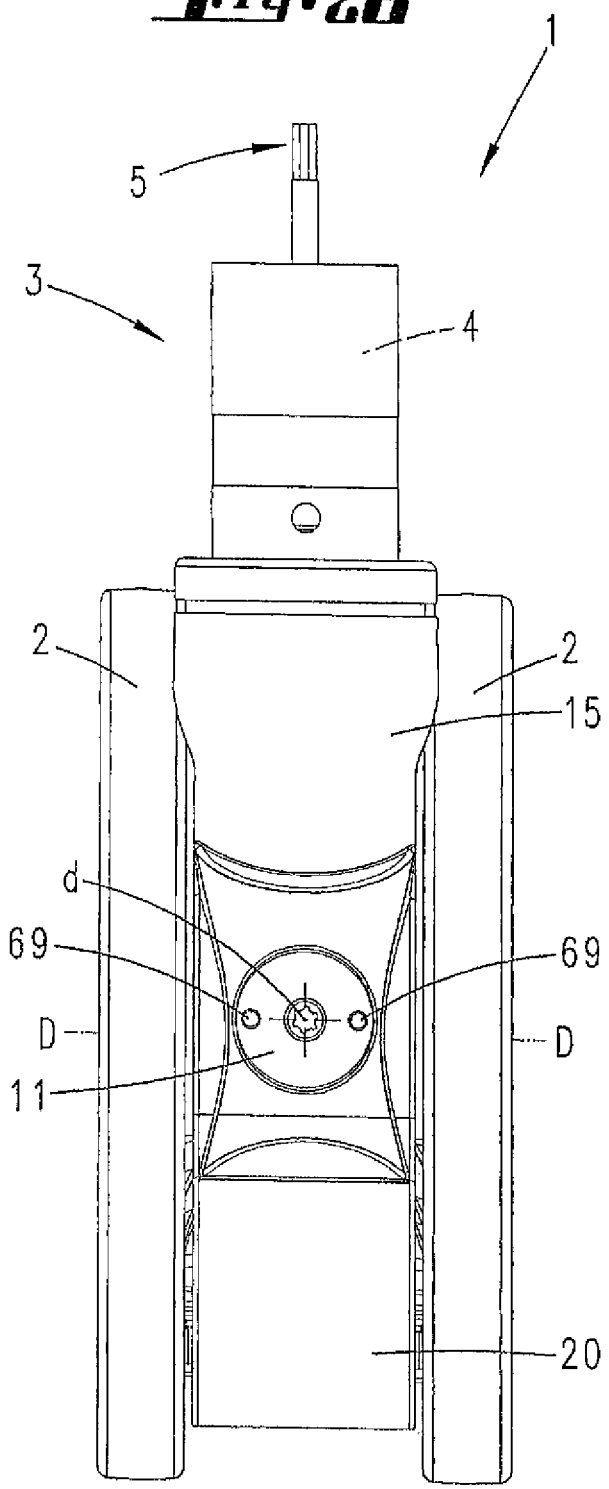
FIG. 26 shows a rear view of the roller according to FIG. 25.
Figure 27:
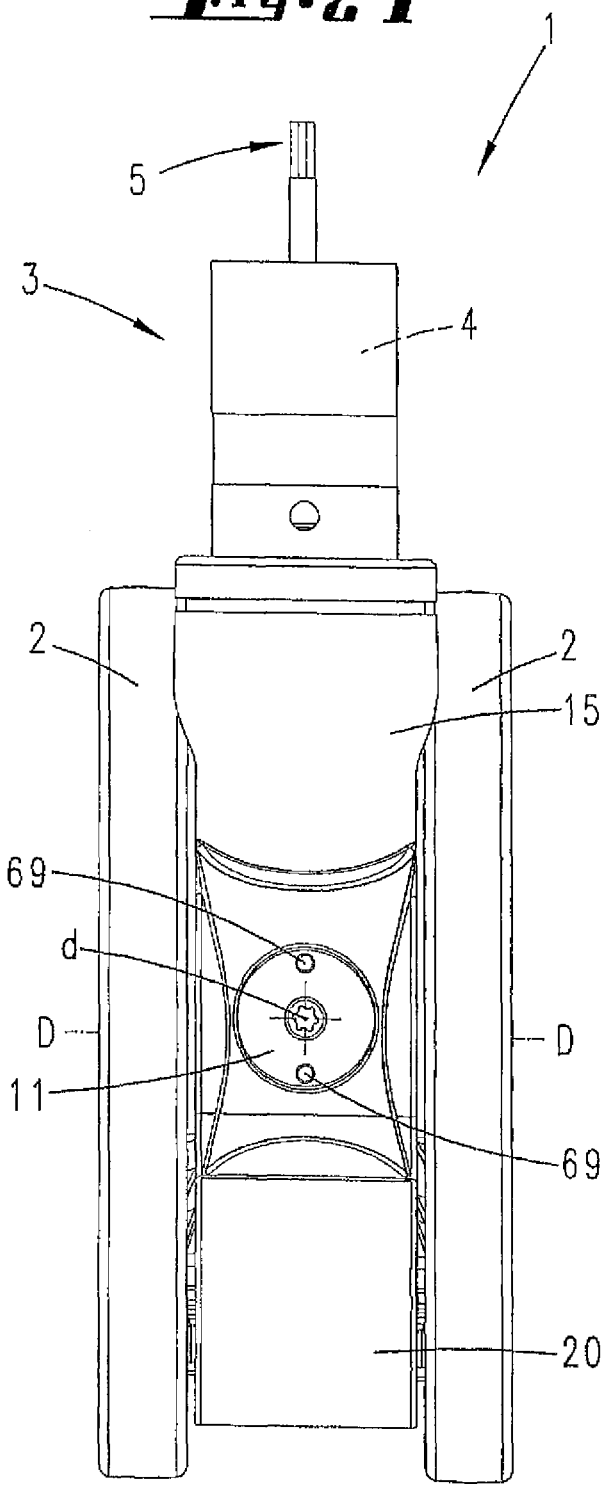
FIG. 27 shows a rear view according to FIG. 26 in a position corresponding to an emergency release from the directional lock or the total lock.

Furthermore, the lever parts 56, 57 are biased into their non-engagement position by a clip spring 64, as illustrated, for example, in FIG. 23.

In the second embodiment, the action by the activating part 10 takes place in particular by means of a clip part 68, which can also have a resilient design.

As is further shown, in a side view the clip part 68 is substantially U-shaped, comprising two U legs 64, 66 and a pivot axis 67. As is apparent, for example, from FIG. 24, the lower U leg 66 shown in the illustration is provided twofold, with the two legs being horizontally spaced apart, which in each case act on an associated head surface of an engagement part 18 associated with each of the wheels.

With regard to the first embodiment but in particular also with regard to the second embodiment, the design of the engagement parts 18 is also of importance, independently of the actual design of the activating part 10 and/or the interaction of this actuating part 10 with the transmission part 7.

Thus, provided with regard to the second embodiment are in particular the formation of each of the engagement parts as levers, which are connected in an articulated manner at associated ends, and/or the action on only one of the two engagement parts associated with the respective wheel so as to bring both engagement parts into the engagement position, and/or the action on the engagement parts by a clip part, and/or the further details that are described above in this regard.

The roller 1 according to the second embodiment is operated basically in the same manner as the roller 1 of the first embodiment.

Figure 13:
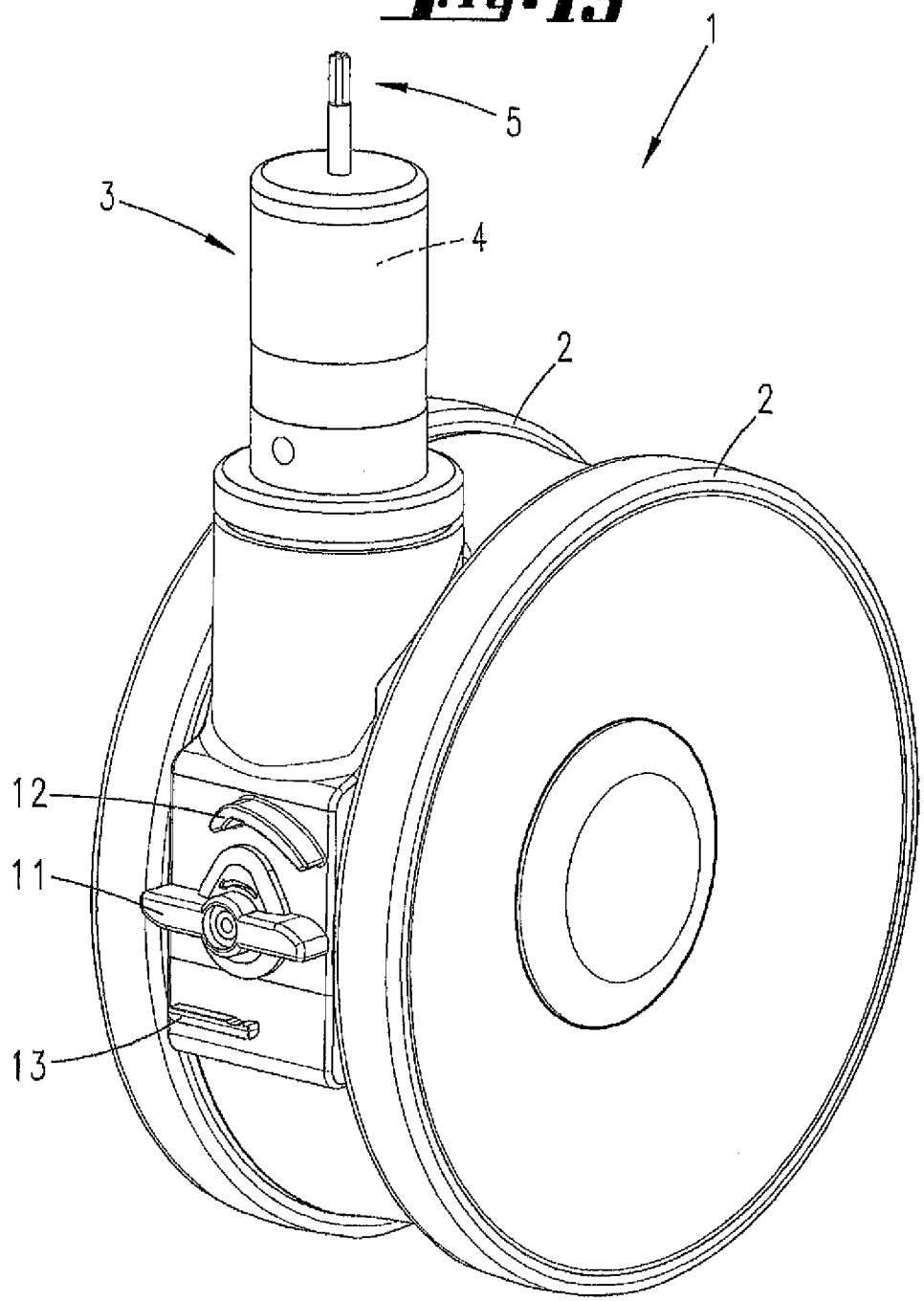
FIG. 13 shows a perspective illustration corresponding to FIG. 1 of a further embodiment.
Figure 21:
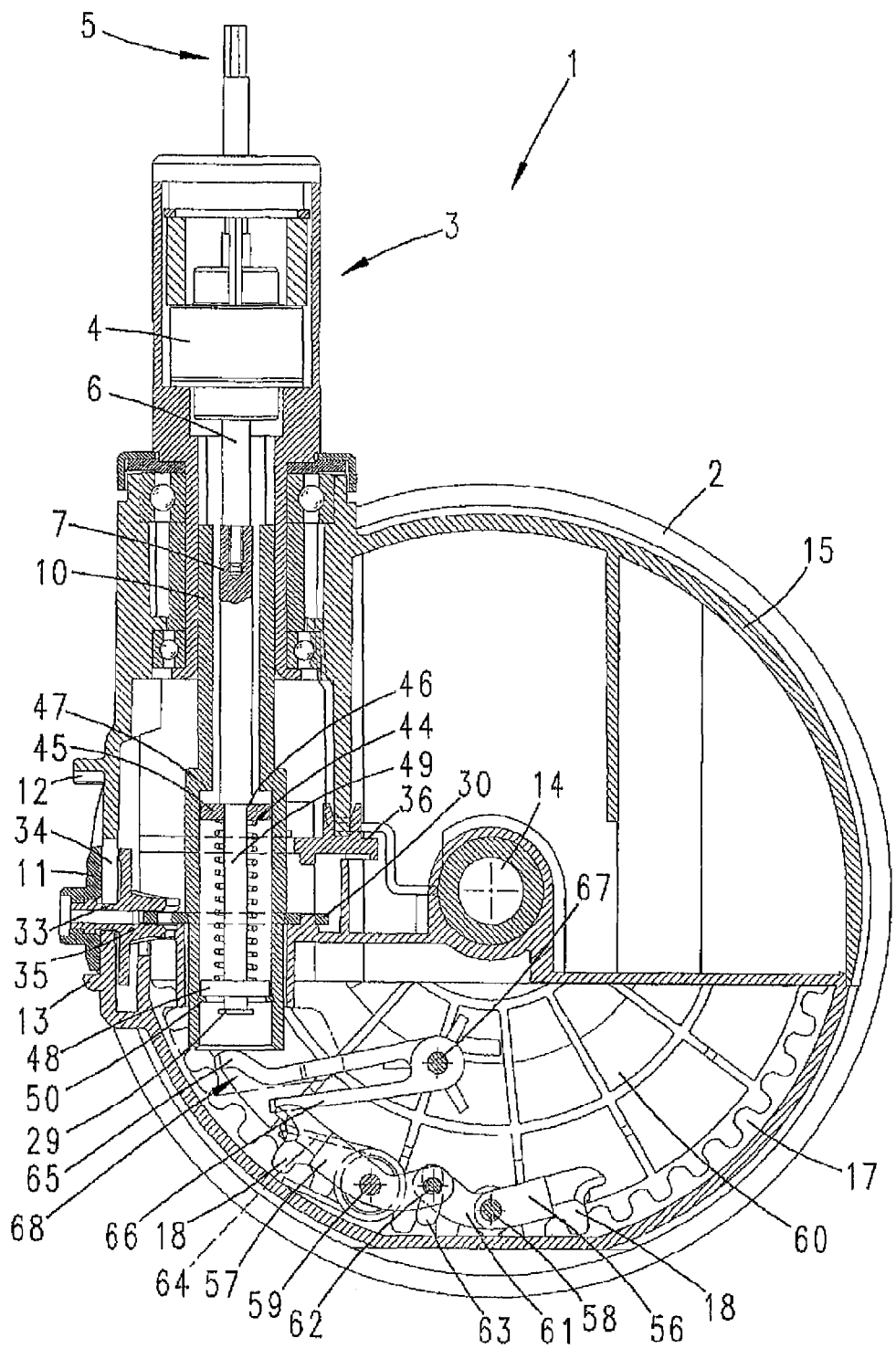
FIG. 21 shows a cross-section through the roller according to FIG. 20, sectioned in the plane XXI-XXI in FIG. 20.
Figure 22:
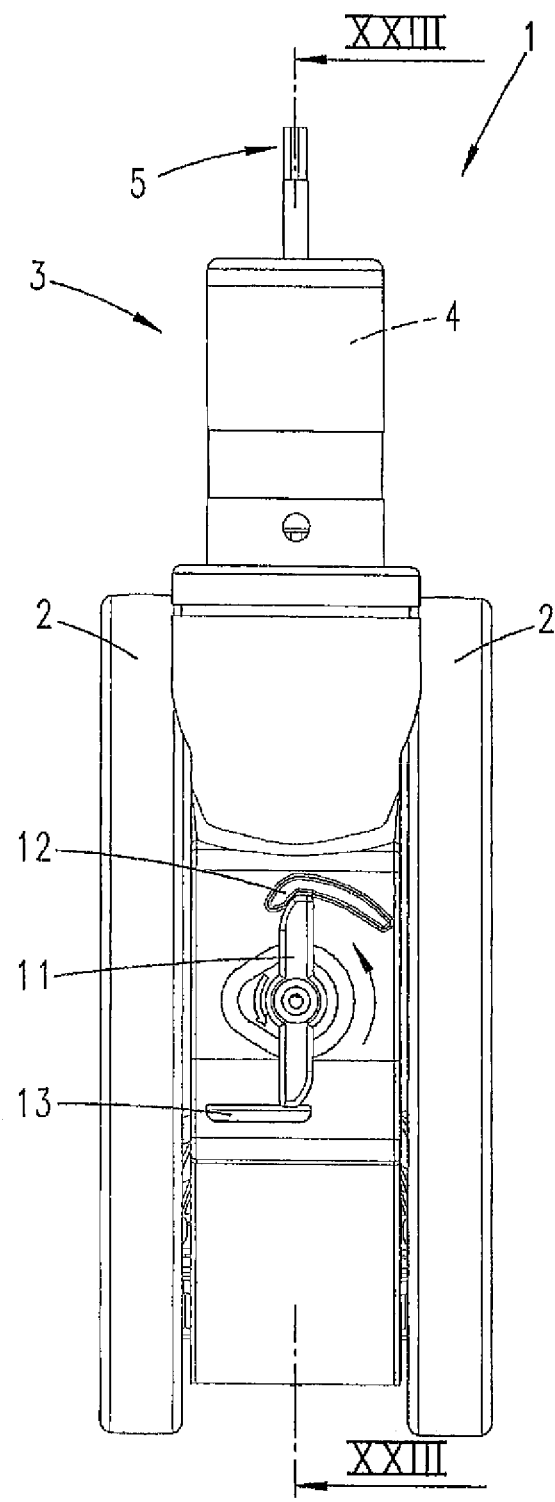
FIG. 22 shows an illustration of the roller according to FIG. 14 after completion of the emergency release.

Starting from the position according to FIGS. 13 to 15, the linear part 6 is moved by means of the electric motor 4 in such a manner that with regard to a total lock, a vertical downward movement of the transmission part 7 takes place, i.e., from a position according to FIG. 15 into a position according to FIG. 21. The compression spring 44, which is pushed downwardly from the upper side by means of the counter limit stop 46, pushes the transmission part 10 downwardly as the result of contact of its opposite end with the limit stop 50 of the transmission part via the support part 48. Thus, the end face of the transmission part 10 acts on the upper U leg of the clip part 68, as is also apparent in particular from FIG. 24. Thus, at the same time, compressive force is exerted on the two lever parts 57 via the lower leg 66 so that the engagement parts 18 are pushed, against the action of the clip spring 64, into their locking position. Due to the lever connection with the lever parts 56, which, accordingly, are provided twofold, the oppositely situated engagement parts 18 are also pushed into the locking position. Thus, in this embodiment as well, the cantilever part 30, which is fixedly connected to the limit stop part 10, likewise moves vertically downwardly. The engagement holes 51 interact with the engagement projections 54 for directional locking.

A linear movement of the linear part 6 of the electric motor 4 in the opposite direction causes the transmission part 7 to move upwardly, thus, for example, from the position in FIG. 15 or FIG. 21 into the position in FIG. 17 (unless only the neutral position is to be reached from the position in FIG. 21). The compression spring 44 is hereby carried along upwardly by means of the head 29 and the support part 48, as a result of which the compressive stress on the support part 45 increases, and by engaging against the counter limit stop 47, the support part pushes the activating part upwardly so that the mentioned position can be reached.

At the same time, as can also be seen here, the cantilever part 30 and therefore the handle 11 move upwardly together with the activating part 10.

Comparable to the above-described emergency release, the emergency release can also be carried out in this second embodiment.

The displaceability of the activating part 10 relative to the stationary transmission part 7, which is basically achieved here, is explained by way of the example of the emergency release, this feature also being of importance independently of this example. This is carried out in each case against a spring force. In the second exemplary embodiment, it is carried out against the action of the same respective compression spring 44.

In both cases of emergency release, the same as in the first embodiment, a counterclockwise rotary movement of the handle 11 is required. One of the handle cantilevers is then supported either on the lower abutment 13 or the upper abutment 12.

As can be seen from this second embodiment, the lower abutment is formed as a horizontally extending, protruding rib, which could correspondingly also be provided in this manner in the first embodiment. On the upper side, a detent recess is formed in the rib, in which detent recess the corresponding part of the hand lever engages in a latching manner after completion of the emergency release. Accordingly, in the case of the upper abutment 12, a receptacle is provided at the zenith of the inner curve guide, which receptacle acts in the same locking manner on the corresponding part of the hand lever after completion of the emergency release carried out in this manner.

A further embodiment of the emergency release and the actuating handle is illustrated in FIGS. 25 to 33.

In this embodiment, the actuating handle 11 is formed as a disc part which is rotatable about the axis of rotation d. In this embodiment the actuating handle 11 is also preferably substantially integrated into the outer contour of the housing 15, which surrounds the actuating handle in this region. There are virtually no significantly protruding regions. An outer surface of the actuating handle 11 preferably continues the spherical curvature of the surrounding housing region, in any case in a neutral or initial position according to FIG. 25.

In the illustrated exemplary embodiment, the actuation can in particular be carried out by means of a fork part by engaging in the two actuation recesses 69. In the exemplary embodiment, as can be seen, the actuation recesses 69 are circular indentations which are formed on a diameter line on opposite sides with regard to the axis of rotation. Alternatively, a slot, for example, can also be provided which, for instance, can be actuated with a coin.

Figure 28:
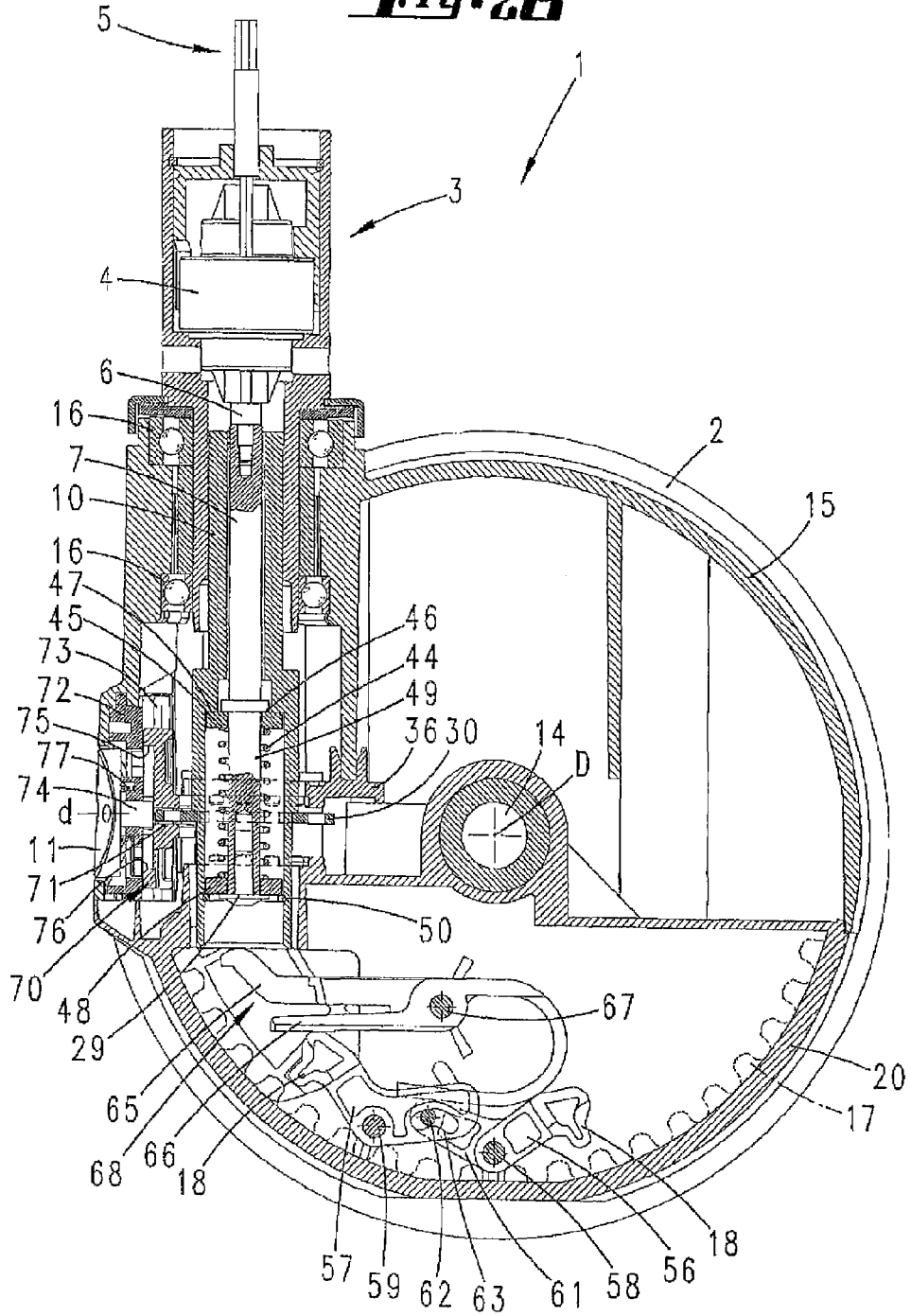
FIG. 28 shows a cross-sectional illustration of the roller according to FIGS. 25 to 27, in the neutral position.

Furthermore, as is apparent from FIG. 28, for instance, the actuating handle 11 in the exemplary embodiment described here, but also in all previously described exemplary embodiments, is disposed on the same side as the activating part 10 with regard to an axis of rotation D of a wheel 2.

The geometric axis of rotation d of the actuating handle also passes through the activating part 10. Moreover, in the exemplary embodiment and preferably, it is arranged to extend in a horizontal plane that passes through the wheel 2. In the exemplary embodiment, the horizontal plane also passes through the physical wheel axle 14 of the wheel 2.

Figure 29:
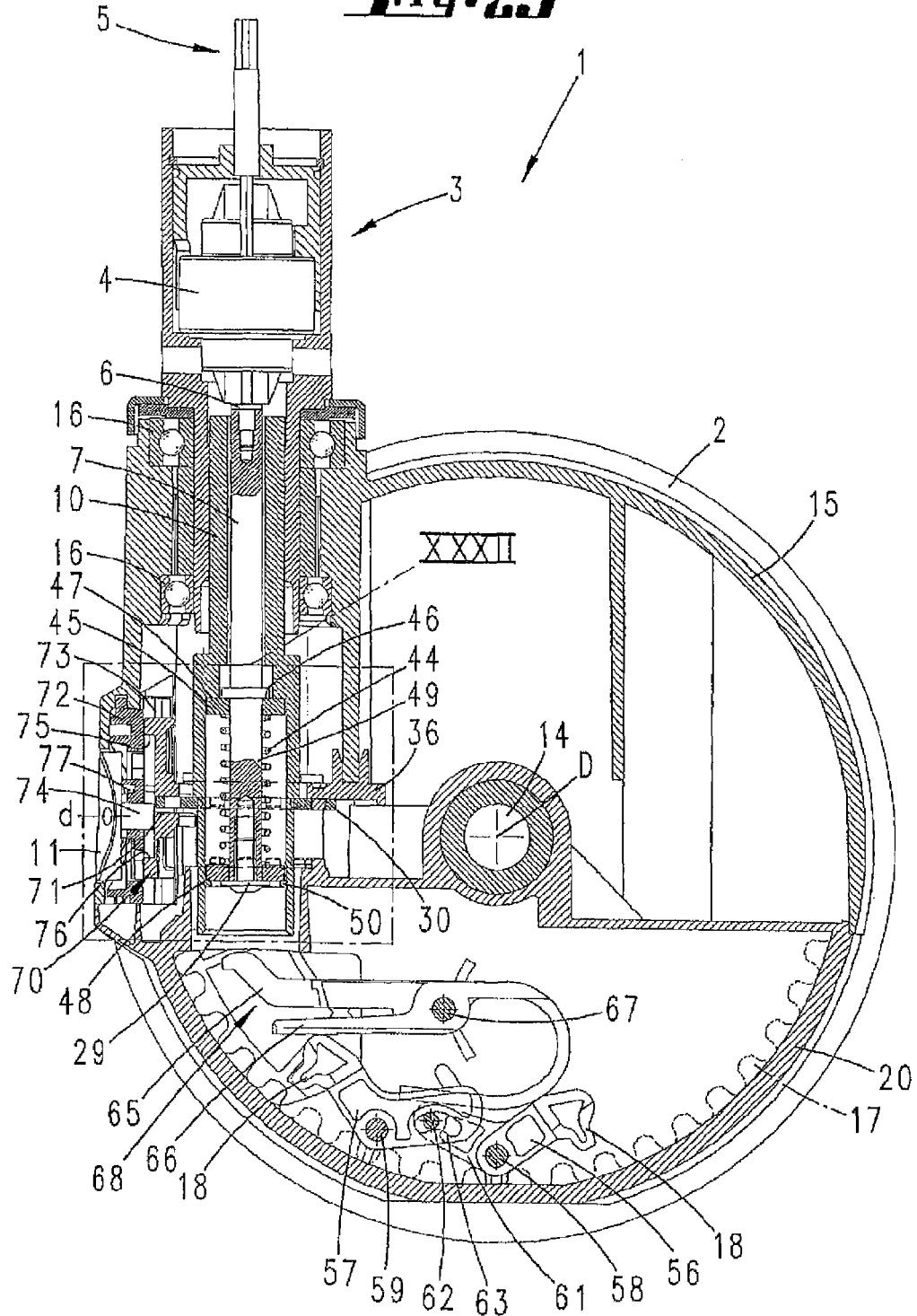
FIG. 29 shows an illustration according to FIG. 28 in the directional lock.
Figure 30:
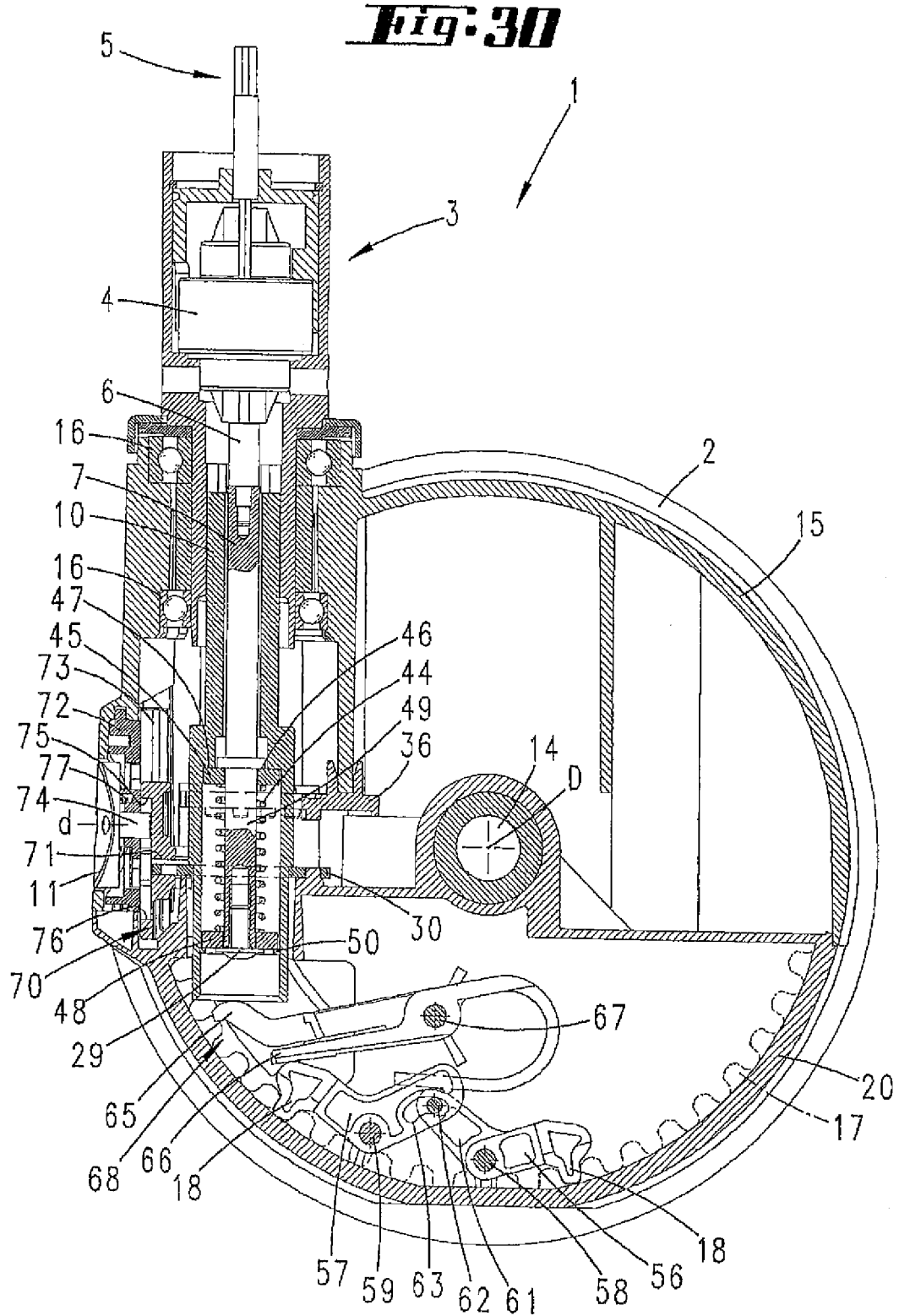
FIG. 30 shows an illustration according to FIG. 28 in the total lock.
Figure 31:
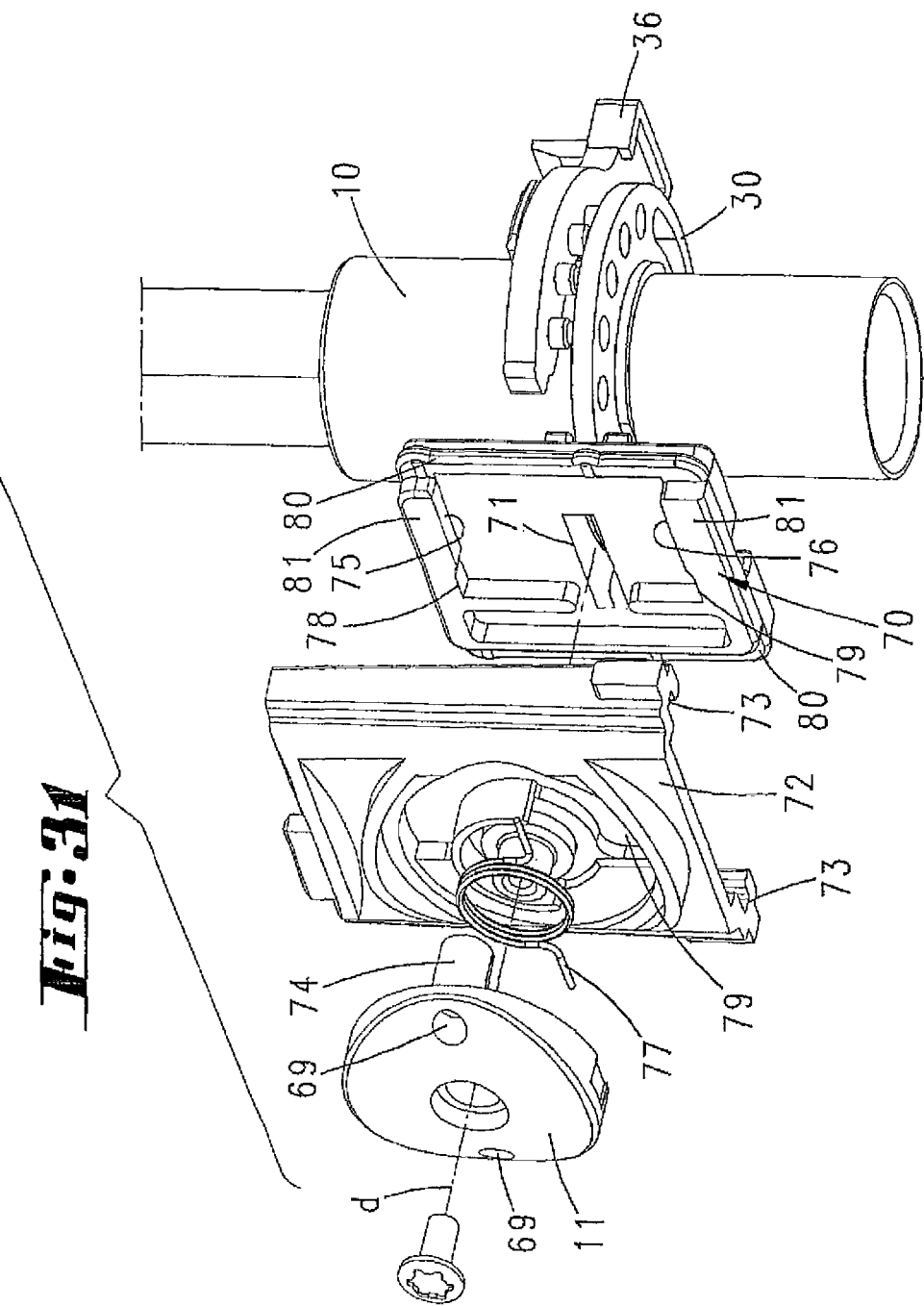
FIG. 31 shows an exploded illustration of the parts interacting for the emergency release.

In the course of actuating the locking device of the roller, whether into the directional lock according to FIG. 29 or into the total lock according to FIG. 30, the activating part 10 is correspondingly moved in the vertical direction. However, in contrast the actuating handle 11 is (vertically) stationary.

In this embodiment as well (see in particular FIG. 31), the activating part 10 interacts with a cantilever 30, which, however, interacts here initially with a sliding part 70, which is guided in the housing 15 in the direction of movement of the activating part 10. As is also apparent, for instance, from FIG. 28, for this purpose the cantilever 30 engages in a horizontal slot 71 of the sliding part 70.

The sliding part 70 is guided in a housing insert part 72. For this purpose, the housing insert part 72 has oppositely situated guide grooves 73 which are open toward one another. Guide projections 80 are formed on opposite sides at the longitudinal edges of the overall rectangularly configured sliding part 70, and are accommodated in the guide grooves 73. The actuating handle 11 has a through pin 74 that points in the direction facing the activating part 10. The through pin 74 is arranged eccentrically with regard to the axis of rotation d of the actuating handle 11. The through pin 74 acts directly on the sliding part 70 through the housing insert part 72.

The sliding part 70 has an upper limit stop 75 and a lower limit stop 76. In the exemplary embodiment and preferably, the limit stops 75, 76 are formed as transversely and horizontally extending ribs 81. In the position corresponding to the directional lock according to FIG. 29, the through pin 74 is closer to the lower limit stop 76, and in the position corresponding to the total lock according to FIG. 30, it is closer to the upper limit stop 75. Positions that are in each case close to or are just touching the limit stops 75 and 76 can also occur. In any case, the design is preferably such that during the customary motor-driven movement of the activating part 10 from the neutral position into the position of the total lock (FIG. 30) or the position of the directional lock (FIG. 29), a (rotational) movement of the actuating handle 11 does not yet take place. A subsequent rotation of the actuating handle 11 moves the through pin 74, on a circular path, further upwardly or downwardly so that the respective locking position is thus overridden.

Figure 32:
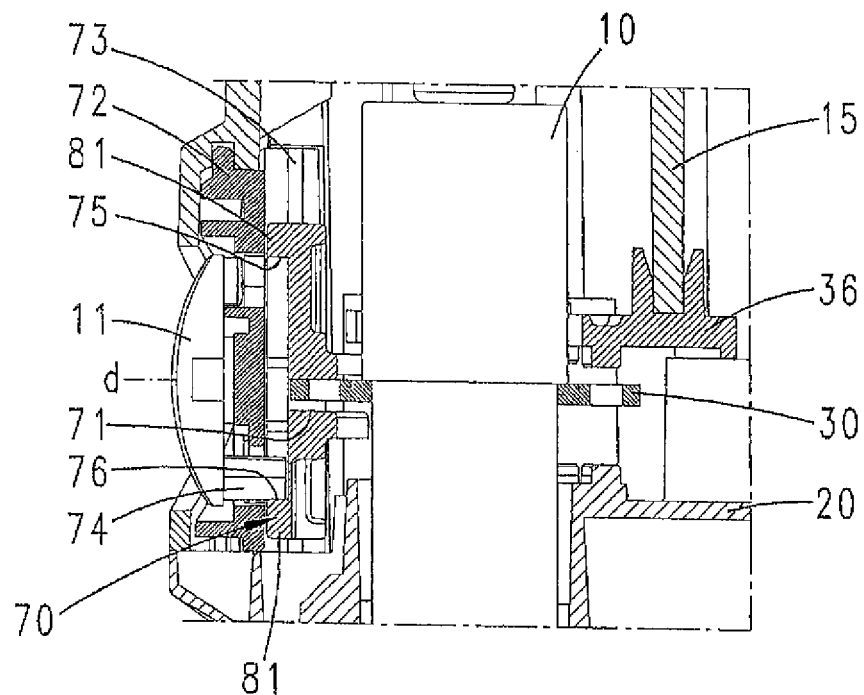
FIG. 32 shows an enlarged detail according to the detail XXXII in FIG. 29, but after completion of an emergency release.
Figure 33:
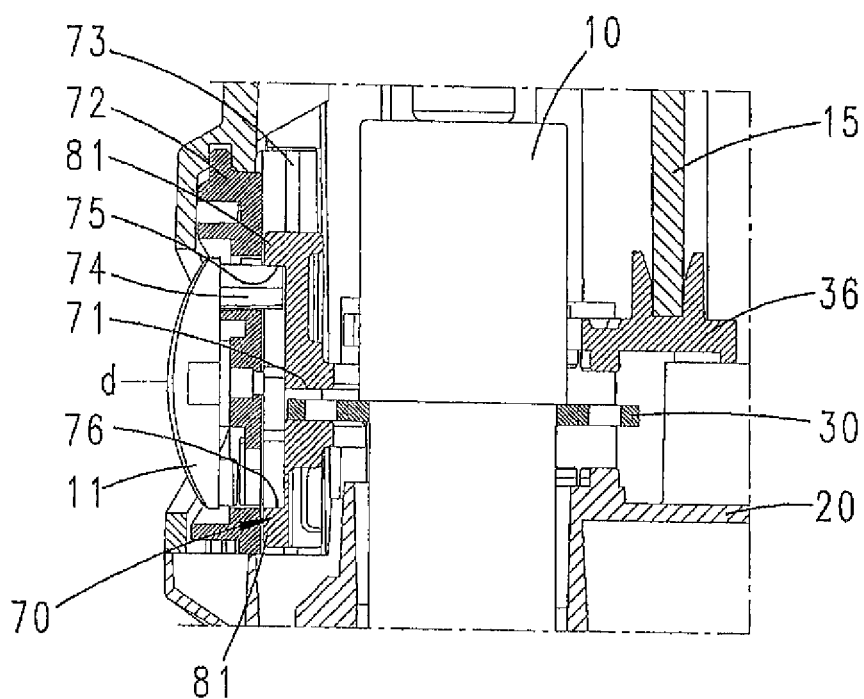
FIG. 33 shows an illustration according to the detail XXXII in FIG. 29, but after completion of an emergency release.

FIGS. 32 and 33 each show a position after rotating the actuating handle 11. Accordingly, the illustration of the detail of FIG. 32 shows the positions of the sliding part 70 and of the through pin 74 after completion of the emergency release from the position of the direction lock which was previously reached by motor drive. The enlarged detail of FIG. 33 shows the positions of the through pin 74 and of the sliding part 70 after completion of the emergency release from the total lock position. In both positions, the through pin 74 is inserted in the respective detent opening 78 or 79.

Furthermore, the actuating handle 11 is biased into a neutral position by a spring, preferably a spiral coiled spring 77. Upon actuation of the emergency release, the through pin 74 moves further into detent openings 78 and 79 in the region of the upper limit stop 75 and the lower limit stop 76, respectively. The release position reached due to the emergency release, which, however, preferably does not correspond to a neutral position of the activating part, is thus fixed.

During a subsequent (repeated) motor-driven activation of the activating part 10, the neutral position of the actuating handle 11 and therefore of the through pin 74 can be reached again due to the spring bias. In the described exemplary embodiment, this requires that the activating part 10 is initially moved further by motor in the direction of the movement forced on the activating part 10 in the case of an emergency release and thus, in the case of the emergency release from the directional lock, is moved further in the direction of a total lock, and in the case of the emergency release from the total lock, is moved further in the direction of the directional lock.

All features disclosed are (in themselves) pertinent to the invention. The disclosure content of the associated/accompanying priority documents (copy of the prior application) is also hereby included in full in the disclosure of the application, including for the purpose of incorporating features of these documents in claims of the present application. The subsidiary claims in their optional subordinated formulation characterize independent inventive refinement of the prior art, in particular to undertake divisional applications based on these claims.

Reference list

1 Roller
2 Wheel
3 Mounting journal
4 Electric motor
5 Power connection
6 Linear part
7 Transmission part
8 Compression spring
9 Compression spring
10 Activating part
11 Grip for actuating handle
12 Abutment
13 Abutment
14 Axle
15 Housing
16 Antifriction bearing
17 Internal toothing
18 Engagement part
19 Leg spring
20 Bottom part
21 Axle
22 Axle
23 Bearing receptacle
24 Acting part
25 Lateral acting portions
26 Support part
27 Washer
28 Upper end
29 Head
30 Cantilever
31 Formation
32 Projection
33 Sliding part
34 Guide
35 Positive locking part
36 Directional lock
37 Detent recess
38 Disc
39 Holding recess
40 Locking part
41 Front end
42 Pivot part (Leg part)
43 Retaining element
44 Compression spring
45 Support part
46 Counter limit stop (of 7)
47 Counter limit stop (of 10)
48 Support part
49 Shank portion
50 Limit stop
51 Engagement holes
52 Step
53 Engagement projection
54 Engagement projection
55 Flat portion
56 Lever part
57 Lever part
58 Axle
59 Axle
60 Housing

Reference list -continued

61 Pivot joint
62 Pivot joint
63 Bearing
64 Clip spring
65 U leg
66 U leg
67 Rotational axis
68 Clip part
69 Actuating recess
70 Sliding part
71 Horizontal slot
72 Housing insert part
73 Guide groove
74 Through pin
75 Limit stop
76 Limit stop
77 Spiral coiled spring
78 Detent opening
79 Detent opening
80 Guide projection
81 Rib

The invention claimed is:

1. A roller comprising a wheel and a locking device, an activating part acting on the locking device for releasing or locking in a position that corresponds to a directional lock and/or in a position that corresponds to a total lock, and the activating part being movable by a drive, a linear movement of a transmission part that is generated by the drive being transmitted via spring force to the activating part in order to move the activating part, and the activating part, in a position corresponding to the total lock or in a position corresponding to the directional lock, being movable relative to the transmission part, against a spring supported on the transmission part, into a release position via an actuating handle that is movable independently of the drive so as to override the total lock or the directional lock, the transmission part being stationary during the total lock or during the directional lock, wherein a geometric axis of rotation of the actuating handle is disposed on the same side as the activating part with respect to an axis of rotation of the wheel, the activating part being disposed offset with respect to the axis of rotation of the wheel and being oriented vertically.

2. The roller according to claim 1, wherein the geometric axis of the actuating handle runs through the activating part.

3. The roller according to claim 1, wherein a horizontal plane which passes through the axis of rotation of the wheel also passes through the actuating handle.

4. The roller according to claim 1, wherein the actuating handle is vertically stationary during a movement of the activating part.

5. The roller according to claim 1, wherein a cantilever interacting with the activating part interacts with a sliding part that is guided in a housing in the direction of movement of the activating part.

6. The roller according to claim 1, wherein a sliding part is guided in a stationary housing insert part through which the actuating handle passes.

7. The roller according to claim 6, wherein the actuating handle has a through pin acting directly on the sliding part.

8. The roller according to claim 7, wherein the sliding part has a lower limit stop and an upper limit stop and the through pin acts on the lower limit stop and on the upper limit stop for releasing the total lock or the directional lock.

9. The roller according to claim 1, wherein the actuating handle is spring-biased into a neutral position.

10. The roller according to claim 1, wherein the actuating handle is actuated via a simple tool comprising a coin or a double claw.

11. The roller according to claim 1, wherein a release position set by hand is latched.

12. The roller according to claim 1, wherein a neutral position of the actuating handle is re-established by a motor-driven movement of the activating part.

13. The roller according to claim 1, wherein a neutral position of the actuating handle is re-established initially by a motor-driven movement of the activating part further in a direction of movement forced by the actuating handle.

* * * * *